United States Patent
Fujihara et al.

(10) Patent No.: US 11,814,090 B2
(45) Date of Patent: Nov. 14, 2023

(54) RAILROAD SYSTEM, OPERATION MANAGEMENT DEVICE, OPERATION MANAGEMENT METHOD, AND NON-TRANSITORY STORAGE MEDIUM TO STORE OPERATION MANAGEMENT PROGRAM

(71) Applicant: Mitsubishi Electric Corporation, Tokyo (JP)

(72) Inventors: Maho Fujihara, Tokyo (JP); Daisuke Tateishi, Tokyo (JP); Hideo Nakata, Tokyo (JP); Shota Shimayoshi, Tokyo (JP); Atsushi Takami, Tokyo (JP); Kenji Ueda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/246,342

(22) PCT Filed: Nov. 4, 2020

(86) PCT No.: PCT/JP2020/041225
§ 371 (c)(1),
(2) Date: Mar. 23, 2023

(87) PCT Pub. No.: WO2022/097207
PCT Pub. Date: May 12, 2022

(65) Prior Publication Data
US 2023/0311964 A1    Oct. 5, 2023

(51) Int. Cl.
*B61L 27/14*  (2022.01)
*G06Q 50/30*  (2012.01)
*B61L 27/04*  (2006.01)

(52) U.S. Cl.
CPC .............. *B61L 27/14* (2022.01); *B61L 27/04* (2013.01); *G06Q 50/30* (2013.01)

(58) Field of Classification Search
CPC .......... B61L 27/14; B61L 27/04; G06Q 50/30
See application file for complete search history.

(56) References Cited

U.S. PATENT DOCUMENTS

2015/0360705 A1* 12/2015 Niinomi .................. B60L 15/40
                                                          701/118
2015/0360706 A1* 12/2015 Niinomi .................. B61L 27/12
                                                          701/19

(Continued)

FOREIGN PATENT DOCUMENTS

EP    3138755 B1    5/2019
JP    H05124514 A   5/1993

(Continued)

OTHER PUBLICATIONS

Barons et al., M. Strategies for the Use of Data and Algorithmic Approaches in Railway Traffic Management, Google Scholar, Version 1.0, Oct. 2017, pp. 1-71. (Year: 2017).*

(Continued)

*Primary Examiner* — Russell Frejd
(74) *Attorney, Agent, or Firm* — BUCHANAN INGERSOLL & ROONEY PC

(57) ABSTRACT

A railroad system includes a plurality of trains and an operation management device. The operation management device manages operation of a subject train that is at least one of the plurality of trains. The operation management device includes a calculation unit and a communication unit. The calculation unit calculates a target arrival time at which the subject train is to arrive at a next station, upon occurrence of an arrival delay of a preceding train at the next station, the preceding train being a train among the plurality of trains and running ahead of the subject train; and, upon arrival of the preceding train at the next station, calculates a target arrival time at which the subject train is to arrive at the (Continued)

next station. The communication unit transmits, to the subject train, information on the target arrival time calculated by the calculation unit.

20 Claims, 12 Drawing Sheets

(56) References Cited

U.S. PATENT DOCUMENTS

| | | | | |
|---|---|---|---|---|
| 2017/0043798 | A1* | 2/2017 | Kawabata | B61L 27/14 |
| 2019/0318253 | A1* | 10/2019 | Maekawa | G06F 30/20 |
| 2020/0156679 | A1 | 5/2020 | Otsuki et al. | |
| 2020/0357091 | A1* | 11/2020 | Minakawa | G06Q 10/063 |
| 2022/0188725 | A1* | 6/2022 | Minakawa | G06Q 10/06311 |

FOREIGN PATENT DOCUMENTS

| | | |
|---|---|---|
| JP | H0976913 A | 3/1997 |
| JP | H09104347 A | 4/1997 |
| JP | 2005335505 A | 12/2005 |
| JP | 2017158330 A | 9/2017 |
| JP | 2018135018 A | 8/2018 |
| JP | 2018202993 A | 12/2018 |
| JP | 2020010457 A | 1/2020 |
| JP | 2020082920 A | 6/2020 |
| WO | 2015166727 A1 | 11/2015 |
| WO | 2016084197 A1 | 6/2016 |

OTHER PUBLICATIONS

Decision to Grant a Patent with translation dated Oct. 19, 2021 by the Japan Patent Office in corresponding Japanese Patent Application No. 2021-519689. (5 pages).

International Search Report (PCT/ISA/210) with translation and Written Opinion (PCT/ISA/237) dated Jan. 19, 2021 by the Japan Patent Office as the International Searching Authority for International Application No. PCT/JP2020/041225. (10 pages).

Notice of Reasons for Refusal with translation dated May 25, 2021 by the Japan Patent Office in corresponding Japanese Patent Application No. 2021-519689. (5 pages).

* cited by examiner

| DEPARTURE STATION | ARRIVAL STATION | DIRECTION | MINIMUM HEADWAY [DEPARTURE-ARRIVAL] |
|---|---|---|---|
| A STATION | B STATION | INBOUND | 60 SECONDS |
| B STATION | C STATION | INBOUND | 65 SECONDS |
| C STATION | D STATION | INBOUND | 60 SECONDS |
| ⋮ | ⋮ | ⋮ | ⋮ |

FIG.7

| DEPARTURE STATION | ARRIVAL STATION | DIRECTION | RUNNING TIME | RUN CURVE ID | MODE | RUN CURVE |
|---|---|---|---|---|---|---|
| A STATION | B STATION | IN-BOUND | 80 | 1 | NORMAL | RUN CURVE C1 |
| A STATION | B STATION | IN-BOUND | 70 | 2 | RECOVERY | RUN CURVE C2 |
| A STATION | B STATION | IN-BOUND | 90 | 3 | FIRST LOW-SPEED | RUN CURVE $C3_1$ |
| A STATION | B STATION | IN-BOUND | 100 | 4 | SECOND LOW-SPEED | RUN CURVE $C3_2$ |
| ⋮ | ⋮ | ⋮ | ⋮ | ⋮ | ⋮ | ⋮ |
| A STATION | B STATION | IN-BOUND | 130 | n+2 | n-TH LOW-SPEED | RUN CURVE $C3_n$ |
| ⋮ | ⋮ | ⋮ | ⋮ | ⋮ | ⋮ | ⋮ |

FIG.8

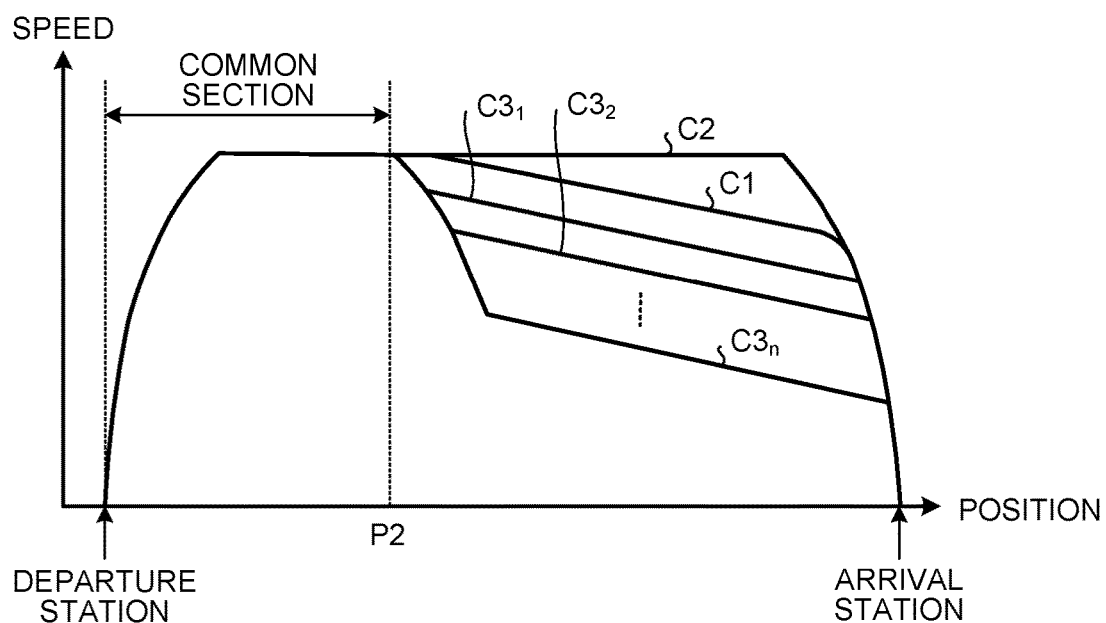

RAILROAD SYSTEM, OPERATION MANAGEMENT DEVICE, OPERATION MANAGEMENT METHOD, AND NON-TRANSITORY STORAGE MEDIUM TO STORE OPERATION MANAGEMENT PROGRAM

FIELD

The present disclosure relates to a railroad system including an operation management device that manages the operation of trains, an operation management device, an operation management method, and an operation management program.

BACKGROUND

There are conventionally known techniques for dealing with a delay of a preceding train by controlling the speed of a following train running behind the preceding train. For example, Patent Literature 1 discloses a prediction control technique for predicting the time of departure of a train from a station when the train standing at the station delays in departing from the station and the following train should stop that station next, and controlling the speed of the following train so that the following train does not stop short of the station but can arrive at the next station in the shortest time after the opening of the in-premise course.

CITATION LIST

Patent Literature

Patent Literature 1: Japanese Patent Application Laid-open No. 2017-158330

SUMMARY

Technical Problem

Unfortunately, the technique described in Patent Literature 1 does not perform the above prediction control in a case where the following train leaves for the next station before the preceding train arrives at the next station. In such a case, the following train runs to the next station at the highest speed. For the technique described in Patent Literature 1, consequently, the following train may get so close to the preceding train that the following train stops between the stations in a case where the delay of the preceding train in arriving at the next station is large. This will lead to a significant delay in the arrival of the following train at the next station.

The present disclosure has been made in view of the above, and an object thereof is to provide a railroad system capable of preventing or reducing the delay of the following train in arriving at the next station even when the preceding train has a delay in arriving at the next station.

Solution to Problem

In order to solve the above-described problems and achieve the object, a railroad system according to the present disclosure comprises a plurality of trains and an operation management device. The operation management device manages operation of a subject train that is at least one of the plurality of trains. The operation management device includes a calculation unit and a communication unit. The calculation unit calculates a target arrival time at which the subject train is to arrive at a next station, upon occurrence of a delay of a preceding train in arriving at the next station, the preceding train being a train among the plurality of trains and running ahead of the subject train, and, upon arrival of the preceding train at the next station, calculate a target arrival time at which the subject train is to arrive at the next station. The communication unit to transmit, to the subject train, information on the target arrival time calculated by the calculation unit.

Advantageous Effects of Invention

The present disclosure can achieve the effect of preventing or reducing the delay of the following train in arriving at the next station even when the preceding train has the delay in arriving at the next station.

BRIEF DESCRIPTION OF DRAWINGS

FIG. 7 is a diagram illustrating an example of run curve information according to the first embodiment.

FIG. 8 is a diagram illustrating an example of a plurality of run curves according to the first embodiment.

DESCRIPTION OF EMBODIMENTS

A railroad system, an operation management device, an operation management method, and an operation management program according to embodiments will be hereinafter described in detail with reference to the drawings.

First Embodiment

Figure 1:
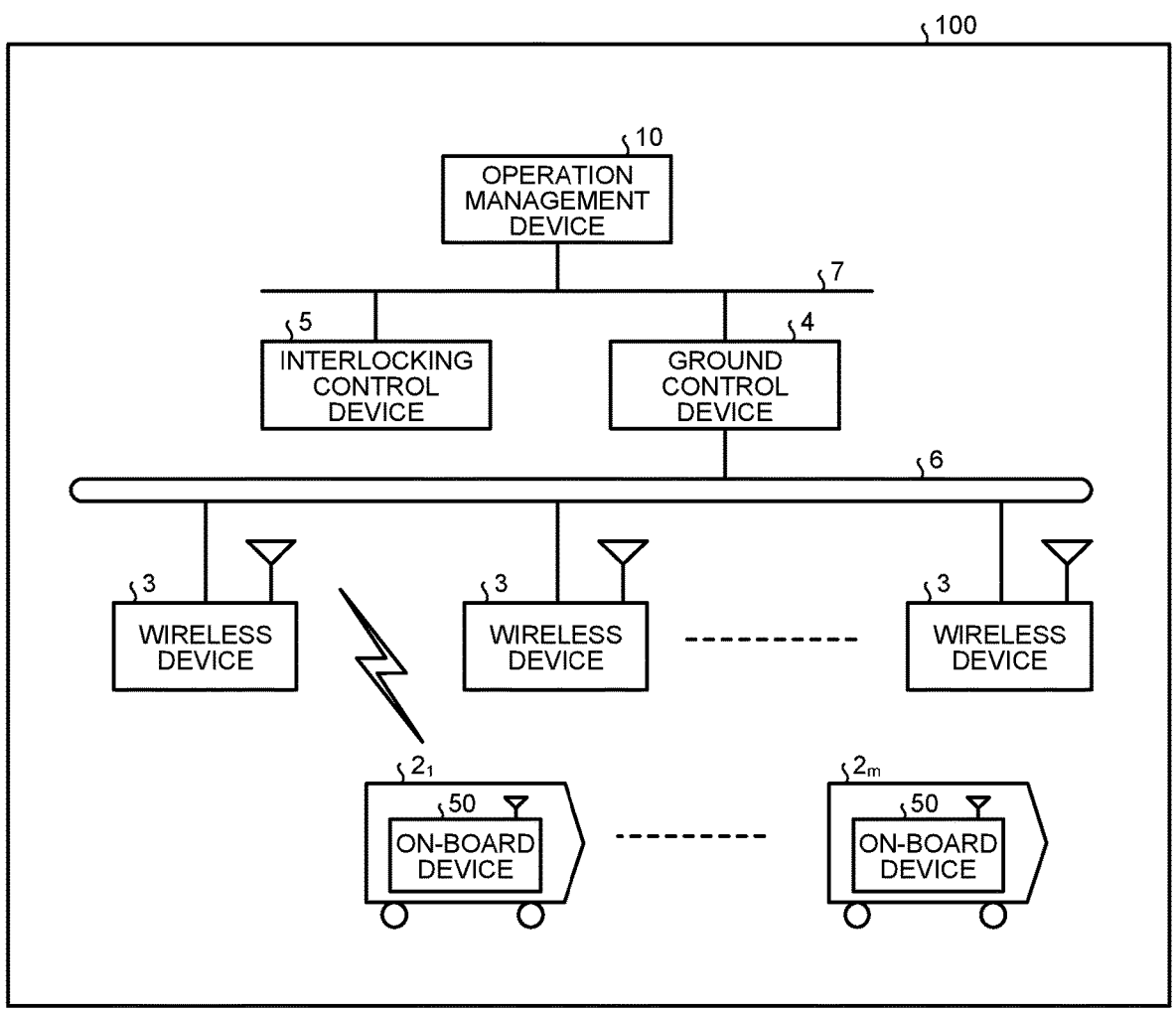
FIG. 1 is a diagram illustrating an exemplary configuration of a railroad system according to a first embodiment.

FIG. 1 is a diagram illustrating an exemplary configuration of a railroad system according to the first embodiment. The railroad system 100 according to the first embodiment includes a plurality of trains $2_1$ to $2_m$, a plurality of wireless devices 3, a ground control device 4, an interlocking control device 5, and an operation management device 10. Reference sign "m" is an integer of two or more. The railroad system 100 is applied to, for example, a high-density track section in which the interval between trains in the operation schedule is about several minutes, but the application of the railroad system 100 is not limited to the high-density track section.

The railroad system 100 includes signal security technology (also called communications-based train control (CBTC)) for operating and controlling the plurality of trains $2_1$ to $2_m$, using communication between the plurality of trains $2_1$ to $2_m$ and ground equipment. The plurality of trains $2_1$ to $2_m$ may be hereinafter collectively referred to as the train(s) 2.

The plurality of wireless devices 3 and the ground control device 4 are connected to each other via a network 6 such that the wireless devices 3 can communicate with the ground control device 4. The ground control device 4, the interlocking control device 5, and the operation management device 10 are connected to each other via a network 7 such that the control device 4, the interlocking control device 5, and the operation management device 10 can communicate with each other. Each of the networks 6 and 7 is an intranet, but may be the Internet or a network other than an intranet and the Internet.

The wireless device 3 relays information transmitted and received between an on-board device 50 installed in the train 2 and the ground control device 4. For example, the wireless device 3 receives a wireless signal transmitted from the on-board device 50 of the train 2 and transmits train state information included in the wireless signal to the ground control device 4. The train state information includes, for example, position information indicating the position of the train 2 and speed information indicating the speed of the train 2.

When acquiring, from the ground control device 4, train control information for the on-board device 50 of the train 2 present in the wireless communication range of the wireless device 3, the wireless device 3 transmits a wireless signal including the acquired train control information to the on-board device 50. The train control information is information for safety use, and includes, for example, route information and stop position information on the train 2.

The route information includes information for determining the route along which the train 2 travels. The stop position information includes information indicating a stop limit position at which the train 2 should stop. The train 2 can travel along the route to the stop limit position. The stop limit position is set at the terminal end of the route if there is no preceding train and other obstructions on the route. If a proceed sign is not given to a departure course or in-premise course, the stop limit position is set before the course.

The ground control device 4 acquires train state information from the wireless device 3, and, on the basis of the acquired train state information, acquires position information indicating the current position of each train 2. In addition, the ground control device 4 generates train control information for each train 2 as described later. The ground control device 4 outputs, to the operation management device 10, train information including the train state information and train control information on each train 2.

The interlocking control device 5 receives course control information output from the operation management device 10. On the basis of the received course control information, the interlocking control device 5 controls a railroad switch (not illustrated) to thereby form the course of each train 2, or generates signal information for each train 2 and outputs the generated signal information for each train 2 to the ground control device 4. The signal information includes information indicating a proceed sign representing a signal that gives permission to proceed to the course.

For a course having no course control information received from the operation management device 10, the interlocking control device 5 generates signal information including information indicating a stop sign representing a signal that does not give permission to proceed to the course, and outputs the signal information to the ground control device 4.

The ground control device 4 generates the above-described train control information for each train 2 on the basis of the signal information transmitted from the interlocking control device 5. On the basis of the train state information and signal information on the train 2, the ground control device 4 generates route information indicating a route on which the train 2 can run. The ground control device 4 can also generate stop position information on the basis of preceding trains and other obstructions present on the route, and add the generated stop position information to the route information and signal information, thereby generating train control information.

The operation management device 10 acquires, from the ground control device 4, the train information on each train 2. On the basis of the acquired train information on each train 2 and stored schedule information, the operation management device 10 generates course control information for each train 2 such that the train 2 runs on course and on time according to the schedule information. The course control information includes information on the train 2 and course information, for example. The operation management device 10 outputs, to the interlocking control device 5, the course control information generated for each train 2.

On the basis of the acquired position information of each train 2 and the stored schedule information, the operation management device 10 determines whether each train 2 has a delay in arriving at the next station. Then, the train 2 determined to have the delay in arriving at the next station is set as a preceding train by the operation management device 10. A train following the preceding train is set as a subject train by the operation management device 10. The subject train is subjected to arrival time adjustment. A train following a preceding train having a delay in arriving at the next station is hereinafter referred to as a subject train or a following train.

In response to determining that the preceding train has a delay in arriving at the next station, the operation management device 10 assumes that a certain delay of the preceding train occurs, and calculates a first target reaching time, which is the target arrival time at which the subject train is to arrive at the next station, irrespective of the degree of delay of the preceding train. The certain delay is a predetermined delay and is set in advance.

The operation management device 10 transmits, to the subject train, first target arrival time information that is information on the calculated first target arrival time. The first target arrival time information transmitted from the operation management device 10 is received by the on-board device 50 of the subject train via the ground control device 4 and the wireless device 3.

Upon acquiring the first target arrival time information from the operation management device 10, the on-board device 50 of the subject train performs automatic operation of the subject train on the basis of the acquired first target arrival time information. As a result, the subject train runs according to the first target arrival time, such that the subject train runs without getting too close to the preceding train, as well as avoiding stopping between stations.

Next, the operation management device 10 determines whether the preceding train has arrived at the next station. In response to determining that the preceding train has arrived at the next station, the operation management device 10 recalculates the target arrival time at which the subject train is to arrive at the next station. The thus recalculated target arrival time is defined as a second target reaching time. The second target reaching time is calculated such that the delay of the following train is reduced on the basis of the degree of delay of the preceding train.

The operation management device 10 transmits, to the subject train, the second target arrival time information that is information on the calculated second target arrival time. The second target arrival time information transmitted from the operation management device 10 is received by the on-board device 50 of the subject train via the ground control device 4 and the wireless device 3.

Upon acquiring the second target arrival time information from the operation management device 10, the on-board device 50 of the subject train performs automatic operation of the subject train on the basis of the acquired second target arrival time information. As a result, the subject train runs according to the second target arrival time.

In this manner, the operation management device in the railroad system 100 calculates the target reaching time and transmits the target reaching time to the subject train which is the following train upon occurrence of a delay of the preceding train for the next station, and recalculates the target reaching time and transmits the target reaching time to the subject train which is the following train upon arrival of the preceding train at the next station.

The operation management device 10, which calculates the target reaching time, failing to know the degree of delay of the preceding train having the delay in arriving at the next station, can prevent the following train from stopping between stations. Then, once the operation management device 10 knows the degree of delay of the preceding train after the arrival of the preceding train at the next station, the operation management device recalculates the target reaching time. As a result, the railroad system 100 can prevent or reduce the delay of the following train in arriving at the next station, preventing the subject train from stopping between stations.

Figure 2:
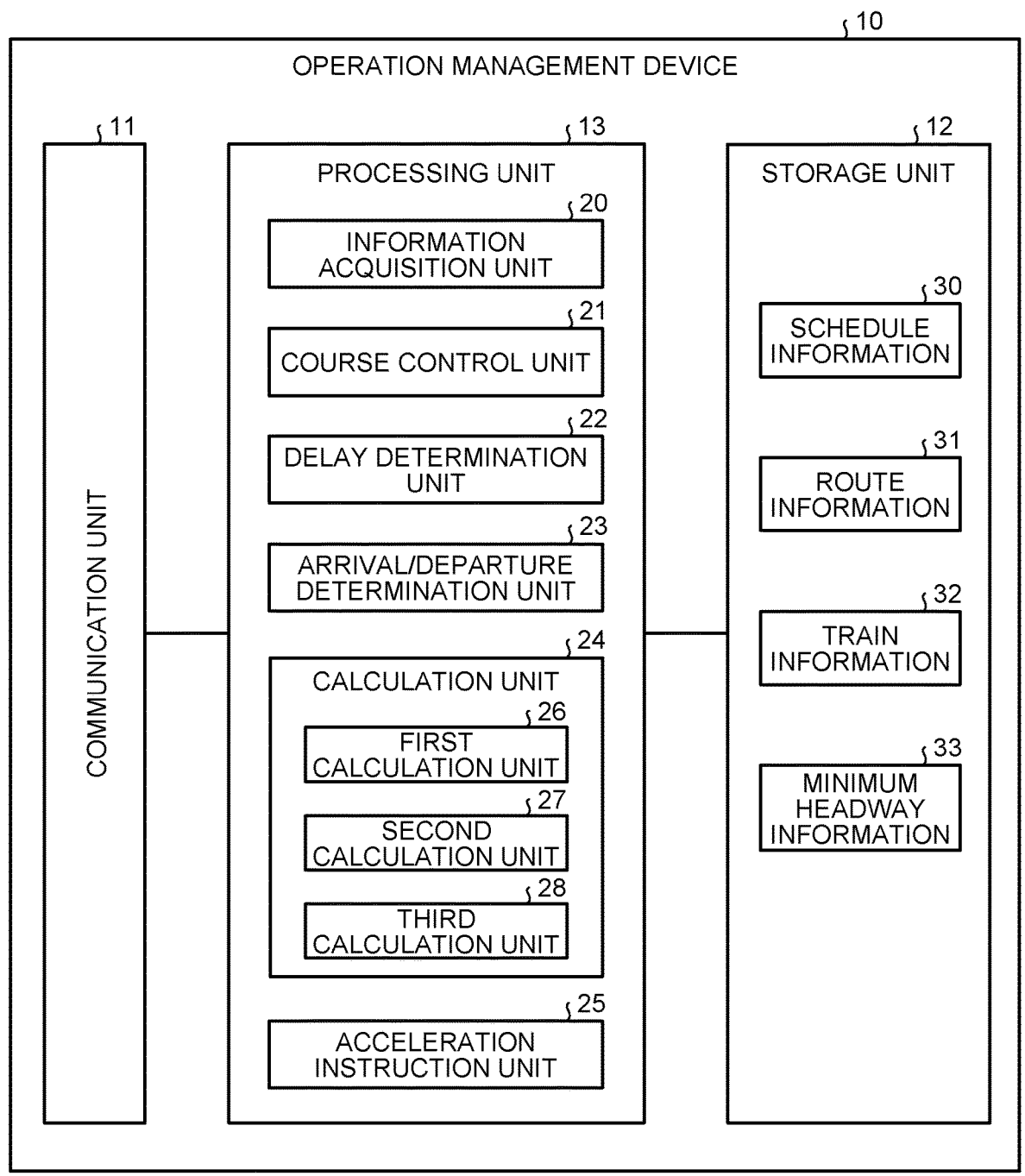
FIG. 2 is a diagram illustrating an exemplary configuration of an operation management device according to the first embodiment.

The operation management device 10 and the on-board device 50 in the railroad system 100 will be described in more detail. FIG. 2 is a diagram illustrating an exemplary configuration of the operation management device according to the first embodiment.

As illustrated in FIG. 2, the operation management device 10 according to the first embodiment includes a communication unit 11, a storage unit 12, and a processing unit 13. The communication unit 11 is communicably connected to the network 7, such that the communication unit 11 can communicate with the network 7 to thereby transmit and receive information to and from the ground control device 4, the interlocking control device 5, or the train 2. Note that the communication unit 11 may be further connected to the network 6, and may be configured to transmit and receive information to and from the train 2 via the wireless device 3 without intervention of the ground control device 4. Alternatively, the communication unit 11 may be configured to transmit and receive information to and from the train 2 via a mobile communication network (not illustrated).

The storage unit 12 stores schedule information 30, route information 31, train information 32, minimum headway information 33, and the like. The schedule information 30 includes, for example, running route information and stop-station time information for each train identifier (ID). The train ID is identification information uniquely assigned to each train 2. The running route information is information indicating a running route on which the train 2 runs. The stop-station time information includes information indicating the arrival time at which the train 2 arrives at each station, and information indicating the departure time at which the train 2 departs from each station.

The route information 31 includes such information for each route ID as the traveling direction and the position of a unit route. The route ID is identification information uniquely assigned to each unit route. A unit route is a minimum route unit including one or more blocks. A combination of plurality of unit routes forms a running route of the train 2. A block, which is a division of a track, is also called a section. The traveling direction is the direction in which the train 2 travels on a unit route. Either inbound or outbound is set as the traveling direction.

The train information 32 includes train state information and train control information on each train 2. The train state information includes information indicating the running position of the train 2 and information indicating the running speed of the train 2. The minimum headway information 33 includes information indicating the minimum headway at each station. The minimum headway is the minimum departure-arrival headway between the preceding train and the following train to allow the following train to run without being decelerated by the brake check pattern.

Figures 3, 4:
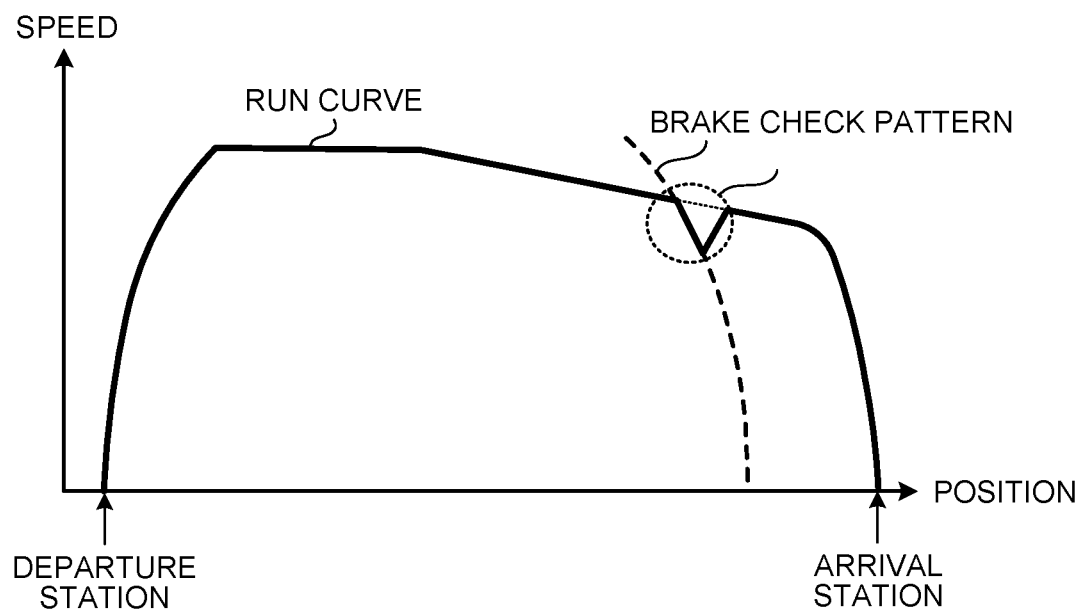
FIG. 3 is a diagram illustrating an example of minimum headway information according to the first embodiment.
FIG. 4 is a diagram for explaining a brake check pattern in the railroad system according to the first embodiment.

FIG. 3 is a diagram illustrating an example of minimum headway information according to the first embodiment. The minimum headway information illustrated in FIG. 3 includes "departure station", "arrival station", "direction", and "minimum headway", which are associated with each other.

"Departure station" is information indicating a departure station from which the train 2 departs. "Arrival station" is information indicating an arrival station at which the train 2 arrives next after departing from a departure station. "Direction", which is the direction in which the train 2 travels, indicates either inbound or outbound. "Minimum headway" is the minimum departure-arrival headway between the preceding train and the following train to allow the following train to run without being decelerated by the brake check pattern. The brake check pattern is used in response to the following train's approach to the preceding train or used in the case of the following train's course being not configured; for example, the brake check pattern is used for applying the brake to decelerate or stop the train 2 when the train 2 exceeds an instruction speed or a speed limit or when the train 2 is about to exceed an instruction speed or a speed limit. Such a brake check pattern is also called a speed check pattern.

FIG. 4 is a diagram for explaining a brake check pattern in the railroad system according to the first embodiment. The example illustrated in FIG. 4 shows a run curve indicating changes in the speed of the train 2 from the departure station to the arrival station, and a brake check pattern set for the train 2.

If the on-board device 50 of the train 2 running on the run curve illustrated in FIG. 4 receives stop position information from the ground control device 4 upon occurrence of a delay of the preceding train in leaving for the next station, the on-board device 50 calculates an allowable speed on the basis of the brake check pattern set for the train 2 and the position of the train 2, and controls the speed of the train 2 on the basis of the allowable speed in comparison with the speed of the train 2. In the example illustrated in FIG. 4, the speed of the train 2 is reduced before the arrival station in accordance with the brake check pattern.

The processing unit 13 illustrated in FIG. 2 includes an information acquisition unit 20, a course control unit 21, a delay determination unit 22, an arrival/departure determination unit 23, a calculation unit 24, and an acceleration instruction unit 25. The information acquisition unit 20 acquires the train information on each train 2 via the ground control device 4, and stores the acquired train information of each train 2 in the storage unit 12.

On the basis of the train information on each train 2 and schedule information stored in the storage unit 12, the course control unit 21 generates course control information for each train 2 such that each train 2 runs on course and on time according to the schedule information. The operation management device 10 outputs, to the interlocking control device 5, the course control information generated for each train 2.

On the basis of the train information on each train 2 stored in the storage unit 12, the delay determination unit 22 determines whether each train 2 has a delay in arriving at the next station. Then, the train 2 determined to have the delay in arriving at the next station is set as a preceding train by the delay determination unit 22. For example, when the preceding train delays a predetermined period of time or more in arriving at the next station, the delay determination unit 22 determines that the preceding train has a delay in arriving at the next station.

On the basis of the train information stored in the storage unit 12, the arrival/departure determination unit 23 determines whether the preceding train determined by the delay determination unit 22 to have the delay arriving at the next station has arrived at the next station. In addition, the arrival/departure determination unit 23 determines whether the preceding train determined by the delay determination unit 22 to have the delay in arriving at the next station has departed from the next station.

On the basis of the train information stored in the storage unit 12, the calculation unit 24 calculates the target arrival time at which the subject train, i.e. the train following the preceding train determined to have the delay by the delay determination unit 22 is to arrive at the next station. The calculation unit 24 can calculate the target arrival time of the subject train at the next station in both cases where the subject train is standing at the previous station located before the next station and where the subject train is running from the previous station toward the next station.

The calculation unit 24 includes a first calculation unit 26, a second calculation unit 27, and a third calculation unit 28. In response to the delay determination unit 22 determining that the preceding train has a delay in arriving at the next station, the first calculation unit 26 calculates the first target arrival time that is the target arrival time at which the subject train, i.e. the train following the preceding train is to arrive at the next station. The preceding train may be hereinafter referred to as the preceding train 2A, and the following train as the following train 2B.

Figure 5:
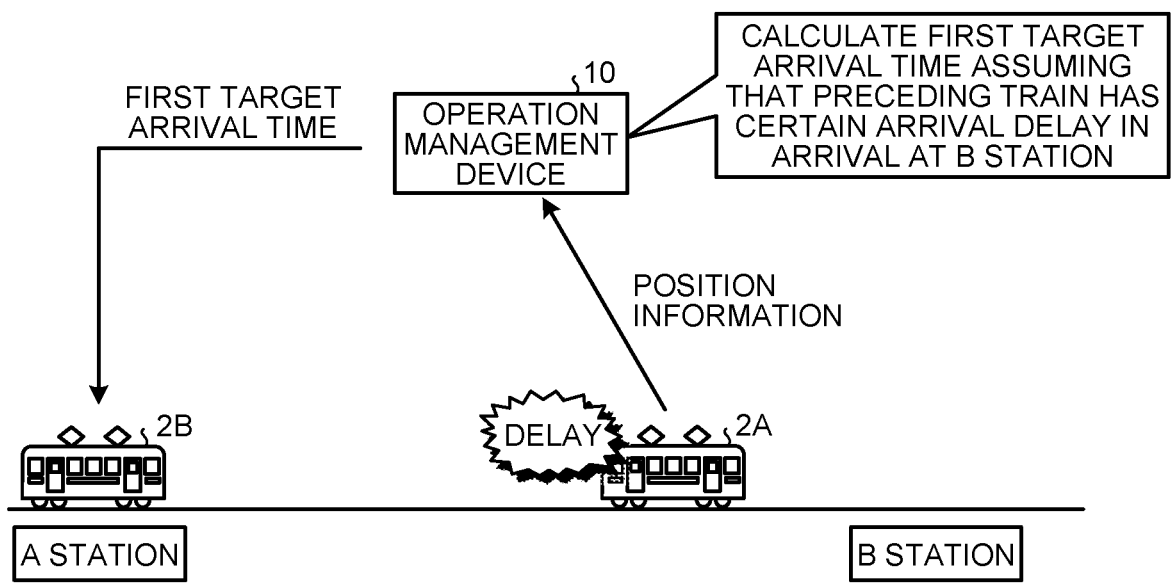
FIG. 5 is a diagram for explaining calculation of a first target arrival time by a first calculation unit of the operation management device according to the first embodiment.

FIG. 5 is a diagram for explaining calculation of the first target arrival time by the first calculation unit of the operation management device according to the first embodiment. In the example in FIG. 5, the preceding train 2A has a delay in arriving at the next station, namely B station, but the following train 2B is standing at the previous station, namely A station. Note that in the state illustrated in FIG. 5, the operation management device 10 does not know the degree of delay of the preceding train 2A in arriving at B station.

When the preceding train 2A and the following train 2B are in the state illustrated in FIG. 5, the first calculation unit 26 assumes that the preceding train 2A has a certain delay time before the arrival at B station, and calculates the first target reaching time of the following train 2B, irrespective of the degree of delay of the preceding train 2A in arriving at B station.

The "certain delay time" is set to such an extent that the following train 2B does not get too close to the preceding train 2A, regardless of the degree of arrival delay of the preceding train 2A. For example, the "certain delay time" is the latest delay time of the train 2, the maximum or average value of the delay time of the train 2 that frequently occurs in the same time slot or between the same stations, or the maximum or average value of the delay time of the train 2 that frequently occurs in the same time slot and between the same stations. Note that the "certain delay time" may be, for example, a delay time predicted from past statistical results on the delay time of the train 2 in the same time slot and between the same stations.

If the on-board device 50 of the train 2 stores information on a plurality of run curves, the first calculation unit 26 can also calculate the first target arrival time that is a target arrival time that allows the following train 2B to run on the slowest run curve among the plurality of run curves.

Once the first target arrival time is calculated by the first calculation unit 26, information on the first target arrival time calculated by the first calculation unit 26 is transmitted from the communication unit 11 of the operation management device 10 to the following train 2B. Upon receiving the information on the first target arrival time from the operation management device 10, the on-board device 50 of the following train 2B determines a run curve suited to the first target arrival time, on the basis of the received information of the first target arrival time.

A run curve is a speed curve representing changes in running speed from the previous station to the next station. In the case where the on-board device 50 has a function of performing automatic operation of the train 2, the on-board device 50 of the following train 2B causes the subject train to run on the determined run curve.

Figure 6:
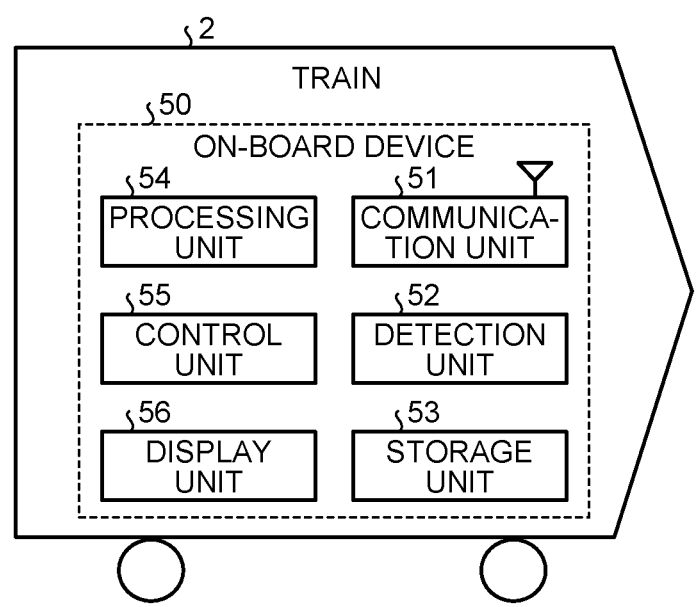
FIG. 6 is a diagram illustrating an exemplary configuration of an on-board device provided in a train according to the first embodiment.

A configuration of the on-board device 50 provided in the train 2 will be described. FIG. 6 is a diagram illustrating an exemplary configuration of the on-board device provided in the train according to the first embodiment. As illustrated in FIG. 6, the on-board device 50 includes a communication unit 51, a detection unit 52, a storage unit 53, a processing unit 54, a control unit 55, and a display unit 56.

The communication unit 51 is wirelessly connected to the wireless device 3 such that the communication unit 51 can communicate with the wireless device 3, and transmits and receives information to and from the ground control device 4 or the operation management device 10. For example, the communication unit 51 receives train control information from the ground control device 4 via the wireless device 3, and receives information on the target reaching time of the train 2 from the operation management device 10 via the ground control device 4 and the wireless device 3.

The detection unit 52 detects the position and speed of the train 2. The detection unit 52 detects the position and speed of the train 2 on the basis of the wheel rotation speed detected by a rotation detector (not illustrated) provided in the train 2. Alternatively, the detection unit 52 can also detect the position and speed of the train 2 on the basis of the position information output from a global positioning system (GPS) receiver (not illustrated) provided in the train 2.

The detection unit 52 outputs train state information to the communication unit 51 on the basis of the result of detection of the position and speed of the train 2. The train state information includes, for example, the train ID, position information indicating the position of the train 2, speed information indicating the speed of the train 2, and operation direction information indicating the traveling direction of the train 2. The communication unit 51 transmits the train state information output from the detection unit 52, to the ground control device 4 via the wireless device 3.

The storage unit 53 stores run curve information including, for each pair of adjacent stations, information on a plurality of run curves having different characteristics. FIG. 7 is a diagram illustrating an example of run curve information according to the first embodiment. The run curve information illustrated in FIG. 7 includes "departure station", "arrival station", "direction", "running time", "run curve ID", "mode", and "run curve", which are associated with each other. "Departure station", "arrival station", and "direction" illustrated in FIG. 7 are the same as "departure station", "arrival station", and "direction" illustrated in FIG. 3.

"Running time", which is expressed by the unit of second, is a period of time for which the train 2 runs from a departure station to an arrival station in the case that the train 2 runs from the departure station to the arrival station according to a run curve. "Run curve ID" is identification information unique to each run curve. "Mode" is a traveling mode represented by a run curve: the example illustrated in FIG. 7 shows normal mode, recovery mode, first low-speed mode, second low-speed mode, . . . , and n-th low-speed mode. Reference sign "n" is an integer of three or more. Note that the number of low-speed modes is not limited to three or more, and may be two or less.

Normal mode is a run curve for use when there is no delay in the preceding train. Recovery mode, which is a run curve for use when there is a delay in the preceding train, represents running in a running time shorter than the running time in the case of running on the run curve in normal mode used when there is no delay in the preceding train. First low-speed mode, second low-speed mode, . . . , and n-th low-speed mode, which are run curves for use when there is a delay in the preceding train, represent running in a running time longer than the running time in the case of running on the run curve in normal mode. The running time in second low-speed mode is longer than the running time in first low-speed mode. The running time in n-th low-speed mode is longer than the running time in second low-speed mode.

"Run curve" includes run curve information. The run curve information is, for example, information in which each position between the departure station and the arrival station is associated with a speed. FIG. 8 is a diagram illustrating an example of a plurality of run curves according to the first embodiment. In FIG. 8, the vertical axis represents the speed of the train 2, and the horizontal axis represents the position between the departure station and the arrival station. The departure station indicates a station from which the train 2 departs, and the arrival station indicates a station at which the train 2 having departed from the departure station arrives next.

As illustrated in FIG. 8, run curves C1, C2, $C3_1$, $C3_2$, . . . , and $C3_n$ are speed curves representing changes in the running speed of the train 2 from the departure station to the arrival station. The run curve C1 is a run curve in normal mode. The run curve C2 is a run curve in recovery mode. The run curves $C3_1$, $C3_2$, . . . , and $C3_n$ are run curves in low-speed mode. The run curves C1, C2, $C3_1$, $C3_2$, . . . , and $C3_n$ may be hereinafter collectively referred to as the run curve(s) C. The run curve C1 is an example of a first run curve, the plurality of run curves $C3_1$, $C3_2$, . . . , and $C3_n$ is an example of a plurality of second run curves, and the run curve C2 is an example of a third run curve.

Let us now return to FIG. 6 to continue the explanation of the on-board device 50. When the operation mode is set to selection mode, the processing unit 54 of the on-board device 50 selects, from among the plurality of run curves C stored in the storage unit 53, a run curve suited to the target arrival time received by the communication unit 51, on the basis of the information of the target arrival time received by the communication unit 51.

For example, on the basis of the information on the target arrival time received by the communication unit 51, the processing unit 54 selects, from among the plurality of run curves C1, C2, $C3_1$, $C3_2$, . . . , and $C3_n$ illustrated in FIG. 8, a run curve suited to the first target arrival time received by the communication unit 51 from among the plurality of run curves C1, C2, $C3_1$, $C3_2$, . . . , and $C3_n$ illustrated in FIG. 8.

For example, if the train 2 is departing from A station, the processing unit 54 selects a run curve suited to the first target arrival time on the basis of the first target arrival time and the running time of the run curve C. If the train 2 is running between A station and B station, the processing unit 54 selects a run curve suited to the first target arrival time on the basis of the first target arrival time, the distance between the train 2 and B station, and the running time of each run curve C.

If the first target arrival time calculated by the operation management device 10 is a target arrival time that allows the following train 2B to run on the slowest run curve, the processing unit 54 selects the run curve suited to the first target arrival time, i.e., the run curve $C3_n$ that is the slowest run curve.

When the operation mode is set to generation mode, the processing unit 54 generates, on the basis of the information on the target arrival time received by the communication unit 51, a run curve representing the speed of the train 2 to allow the train 2 to arrive at the arrival station at the target arrival time calculated by the operation management device 10. Note that the on-board device 50 may be configured to be capable of executing only one of selection mode and generation mode.

When the control mode is set to automatic operation mode, the control unit 55 controls the running speed of the train 2 on the basis of the run curve selected or generated by the processing unit 54. As a result, the control unit 55 can allow the train 2 to run at the speed specified by the run curve.

When the control mode is set to manual operation mode, the control unit 55 can cause the display unit 56 to display the run curve selected or generated by the processing unit 54. The operator of the train 2 operates the train 2 according to the run curve displayed on the display unit 56, such that the train 2 can run at the speed specified by the run curve. Note that the on-board device 50 may be configured to be capable of executing only one of automatic operation mode and manual operation mode.

Next, the second calculation unit 27 of the calculation unit 24 illustrated in FIG. 2 will be described. Upon arrival of the preceding train 2A at the next station, the second calculation unit 27 calculates, for each following train 2B, the second target arrival time that is the target arrival time at which the following train 2B is to arrive at the next station. The calculation of the second target arrival time by the second calculation unit 27 is performed when the following train 2B is standing at the previous station or running between the previous station and the next station.

Figure 9:
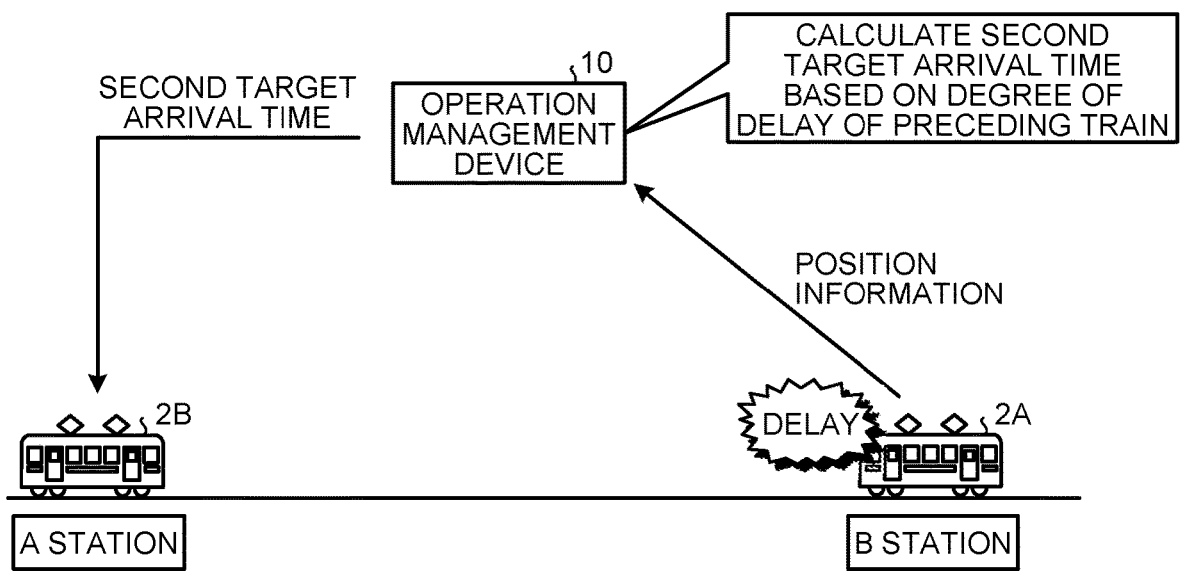
FIG. 9 is a diagram for explaining calculation of a second target arrival time by a second calculation unit of the operation management device according to the first embodiment.

FIG. 9 is a diagram for explaining calculation of the second target arrival time by the second calculation unit of the operation management device according to the first embodiment. In the example illustrated in FIG. 9, since the preceding train 2A has arrived at B station, the degree of delay of the preceding train 2A is known; therefore, the second calculation unit 27 calculates the second target reaching time such that the delay of the following train 2B is reduced on the basis of the degree of delay of the preceding train 2A.

For example, the second calculation unit 27 calculates the second target reaching time using Formula (1) below, on the basis of the schedule information 30, the train information 32, and the minimum headway information 33 stored in the storage unit 12. In Formula (1), "T2" is the second target reaching time, "t1" is the arrival time at which the preceding train 2A arrives at the next station, "t2" is the scheduled stoppage period of the preceding train 2A at the next station, and "t3" is the minimum headway. For example, the second calculation unit 27 calculates the scheduled stoppage period of the preceding train 2A at the next station, on the basis of the stop time information included in the schedule information 30.

$$T2 = t1 + t2 + t3 \qquad (1)$$

Once the second target arrival time is calculated by the second calculation unit 27, information on the second target arrival time calculated by the second calculation unit 27 is transmitted from the communication unit 11 of the operation management device 10 to the following train 2B. Upon the reception of the information of the second target arrival time from the operation management device 10 at the communication unit 51, the processing unit 54 of the on-board device 50 in the following train 2B determines a run curve suited to the second target arrival time, on the basis of the received information on the second target arrival time.

If the train 2 is departing from A station, the processing unit 54 selects a run curve suited to the second target arrival time, on the basis of the second target arrival time and the running time of the run curve C. If the train 2 is running between A station and B station, the processing unit 54 selects a run curve suited to the second target arrival time, on the basis of the second target arrival time, the distance between the train 2 and B station, and the running time of each run curve C.

When the operation mode is set to selection mode, the processing unit 54 selects, from among the plurality of run curves C stored in the storage unit 53, a run curve suited to the second target arrival time calculated by the operation management device 10, on the basis of the information on the second target arrival time received by the communication unit 51. When the operation mode is set to generation mode, the processing unit 54 generates, on the basis of the information on the second target arrival time received by the communication unit 51, a run curve representing the speed of the train 2 to allow the train 2 to arrive at the arrival station at the second target arrival time.

When the control mode is set to automatic operation mode, the control unit 55 controls the running speed of the train 2 on the basis of the run curve selected or generated by the processing unit 54. As a result, the control unit 55 can cause the train 2 to run at the speed specified by the run curve suited to the second target arrival time, instead of the run curve suited to the first target arrival time.

When the control mode is set to manual operation mode, the control unit 55 can cause the display unit 56 to display the run curve selected or generated by the processing unit 54. The operator of the train 2 operates the train 2 according to the run curve displayed on the display unit 56, instead of the run curve suited to the first target arrival time, such that the train 2 can run at the speed specified by the run curve suited to the second target arrival time.

Next, the third calculation unit 28 of the calculation unit 24 illustrated in FIG. 2 will be described. Upon departure of the preceding train 2A from the next station, the third calculation unit 28 calculates as the third target arrival time that is the target arrival time at which the following train 2B is to arrive at the next station. The calculation of the third target arrival time by the third calculation unit 28 is performed when the following train 2B is standing at the previous station or running between the previous station and the next station.

Figure 10:
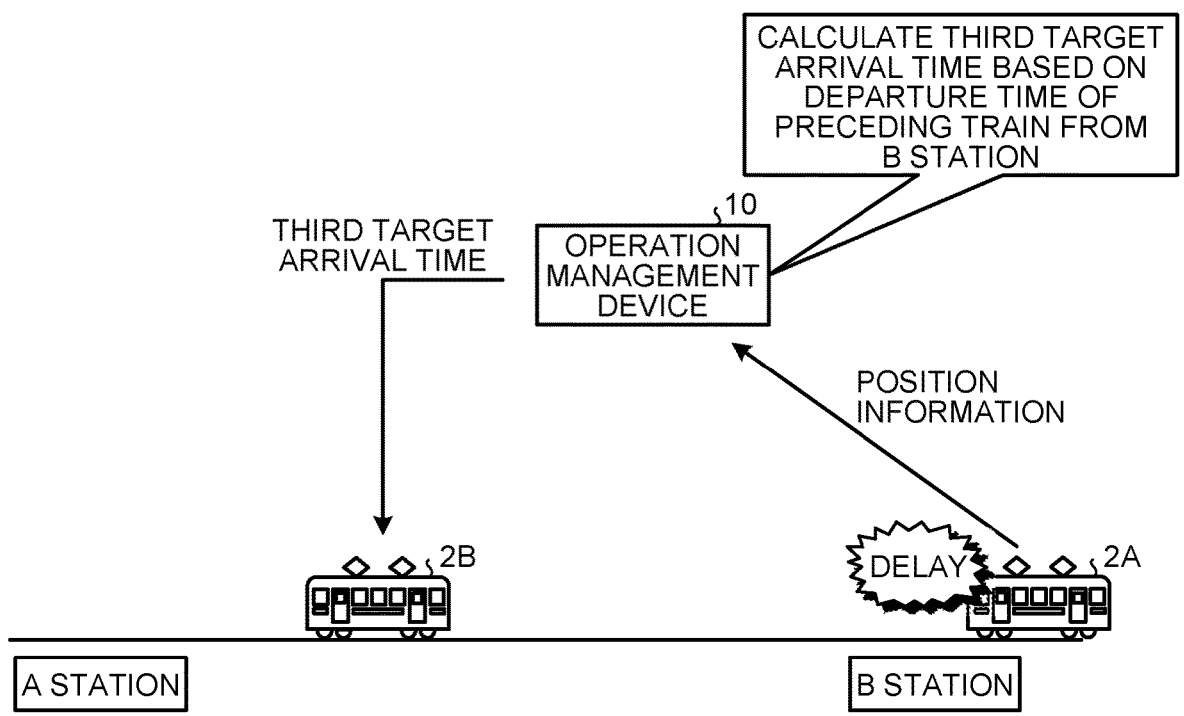
FIG. 10 is a diagram for explaining calculation of a third target arrival time by a third calculation unit of the operation management device according to the first embodiment.

FIG. 10 is a diagram for explaining calculation of the third target arrival time by the third calculation unit of the operation management device according to the first embodiment. In the example illustrated in FIG. 10, the preceding train 2A is departing from B station while the following train 2B is running between A station and B station. The third calculation unit 28 calculates the third target arrival time such that the arrival delay of the following train 2B is reduced or eliminated.

For example, on the basis of the train information 32, the minimum headway information 33, and the like, the third calculation unit 28 calculates the third target arrival time that is an entry possible time at which the following train 2B can predictably enter B station.

Once the third target arrival time is calculated by the third calculation unit 28, information on the third target arrival time calculated by the third calculation unit 28 is transmitted from the communication unit 11 of the operation management device 10 to the following train 2B. Upon the reception of the information of the third target arrival time from the operation management device 10 at the communication unit 51, the processing unit 54 of the on-board device 50 in the following train 2B determines a run curve suited to the third target arrival time, on the basis of the received information of the third target arrival time.

When the operation mode is set to selection mode, the processing unit 54 selects, from among the plurality of run curves C stored in the storage unit 53, a run curve suited to the third target arrival time calculated by the operation management device 10, on the basis of the information on the third target arrival time received by the communication unit 51. For example, if the train 2 is departing from A station, the processing unit 54 selects a run curve suited to the third target arrival time, on the basis of the third target arrival time and the running time of the run curve C. If the train 2 is running between A station and B station, the processing unit 54 selects a run curve suited to the third target arrival time, on the basis of the third target arrival time, the distance between the train 2 and B station, and the running time of each run curve C.

When the operation mode is set to generation mode, the processing unit 54 generates, on the basis of the information on the third target arrival time received by the communication unit 51, a run curve representing the speed of the train 2 to allow the train 2 to arrive at the arrival station at the third target arrival time.

When the control mode is set to automatic operation mode, the control unit 55 controls the running speed of the train 2 on the basis of the run curve selected or generated by the processing unit 54. As a result, the control unit 55 can cause the train 2 to run at the speed specified by the run curve suited to the third target arrival time, instead of the run curve suited to the second target arrival time.

When the control mode is set to manual operation mode, the control unit 55 can cause the display unit 56 to display the run curve selected or generated by the processing unit 54. The operator of the train 2 operates the train 2 according to the run curve displayed on the display unit 56, instead of the run curve suited to the second target arrival time, such that the train 2 can run at the speed specified by the run curve suited to the third target arrival time.

Next, the acceleration instruction unit 25 illustrated in FIG. 2 will be described. Assume that, as illustrated in FIG. 10, the preceding train 2A is departing from B station while the following train 2B is about to depart from A station or while the following train 2B is running between A station and B station. In this case, the acceleration instruction unit 25 can cause the communication unit 11 to transmit a full acceleration instruction to the on-board device 50 of the following train 2B.

For example, the acceleration instruction unit 25 causes the communication unit 11 to transmit the full acceleration instruction to the following train 2B at the timing when the following train 2B is allowed to enter the platform of B station after the departure of the preceding train 2A from B station. Upon the reception of the full acceleration instruction from the operation management device 10 at the communication unit 51, the processing unit 54 of the on-board device 50 in the following train 2B selects the fastest run curve from among the plurality of run curves stored in the storage unit 53.

For example, when the run curve information is in the state illustrated in FIG. 7, the processing unit 54 selects the run curve C2, which is the fastest run curve, from among the run curves C1, C2, C3$_1$, C3$_2$, . . . , and C3$_n$. When the control mode is set to automatic operation mode, the control unit 55 controls the running speed of the train 2 on the basis of the run curve C2 selected by the processing unit 54. As a result, the following train 2B can accelerate to enter the station without decelerating according to the brake check pattern. In this manner, the operation management device 10 can contribute to the delay recovery of the following train 2B. Note that the operation management device 10 selectively transmits either the third target arrival time information or the full acceleration instruction to the on-board device 50. For example, the operation management device 10 transmits either the third target arrival time information or the full acceleration instruction to the on-board device 50 according to the type of the train 2.

Figure 11:
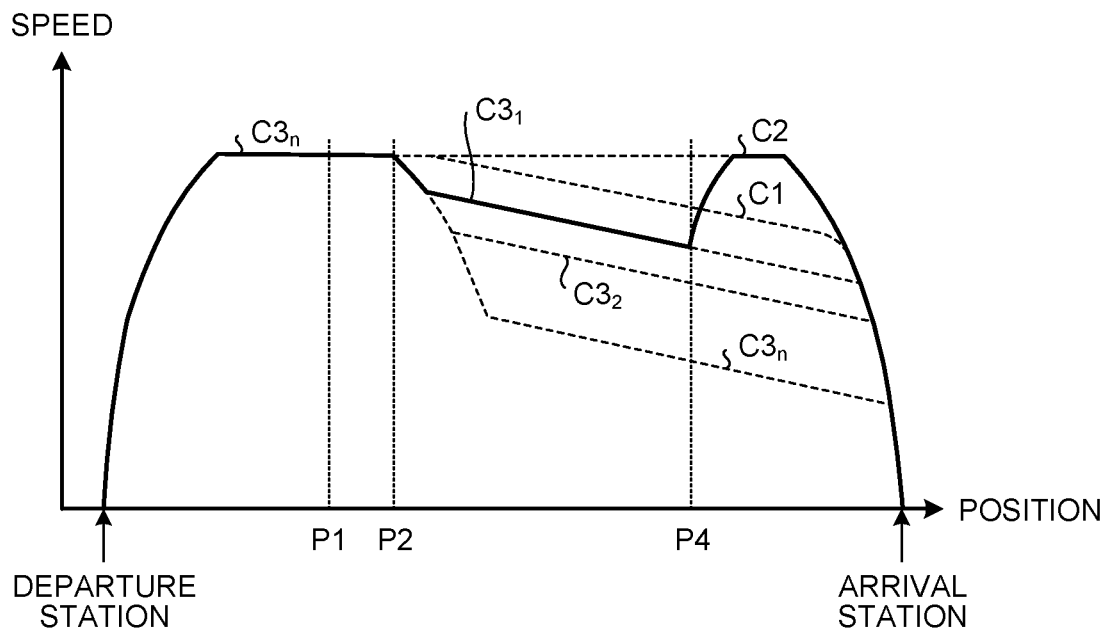
FIG. 11 is a diagram illustrating an example of a run curve selected by the processing unit of the on-board device on the basis of each of the first target arrival time, the second target arrival time, and the third target arrival time calculated by the processing unit of the operation management device according to the first embodiment.

A description will be made as to selection of a run curve by the processing unit 54 of the on-board device 50 on the basis of each target arrival time calculated by the processing unit 13 of the operation management device 10. FIG. 11 is a diagram illustrating an example of a run curve selected by the processing unit of the on-board device on the basis of each of the first target arrival time, the second target arrival time, and the third target arrival time calculated by the processing unit of the operation management device according to the first embodiment.

In the example illustrated in FIG. 11, the preceding train 2A has a delay in arriving at B station when the following train 2B is going to depart from A station. Information on the first target arrival time is therefore transmitted from the operation management device to the on-board device 50 of the following train 2B standing at A station. In the example illustrated in FIG. 11, the processing unit 54 of the on-board device 50 in the following train 2B selects the run curve suited to the first target arrival time, i.e., the run curve C3$_n$ in n-th low-speed mode that represents the lowest speed. The control unit 55 of the following train 2B causes the following train 2B to run at the speed specified by the run curve C3$_n$.

Thereafter, the operation management device 10 determines that the preceding train 2A has arrived at B station while the following train 2B is running at the speed specified by the run curve C3$_n$ after departing from A station, in which case information on the second target arrival time is transmitted from the operation management device 10 to the on-board device 50 of the following train 2B. In the example illustrated in FIG. 11, while the following train 2B is present at a position P1, information on the second target arrival time is transmitted to the on-board device 50 of the following train 2B.

The processing unit 54 of the on-board device 50 in the following train 2B selects the run curve suited to the second target arrival time, i.e., the run curve C3$_1$ in first low-speed mode having a shorter running time than the run curve C3$_n$ in n-th low-speed mode. The control unit 55 of the following train 2B causes the following train 2B to run at the speed specified by the run curve C3$_1$.

As illustrated in FIG. 8, the plurality of run curves C1, C2, C3$_1$, C3$_2$, . . . , and C3$_n$ have a common section from the departure station to a position P2, and have a common speed characteristic in the curve common section. Thus, in the case where the preceding train 2A arrives at B station while the following train 2B is present at the position P1 before the position P2, the run curve selected by the processing unit 54 is switched from the run curve C3$_n$ to the run curve C3$_1$, but the speed at the position P1 does not differ between the run curve C3$_n$ and the run curve C3$_1$.

Thus, in the case where the preceding train 2A arrives at B station after the following train 2B departs from A station, speed switching is not required, and the processing unit 54 can easily select a run curve. For example, the processing unit 54 can easily calculate the arrival time expected for the train 2 running on each run curve by subtracting, from the running time of each run curve, the time taken for the following train 2B to move from A station to the position P1, and can easily select a run curve. Note that the position P2 is an example of a specific position.

In addition, the operation management device 10 is able to determine the degree of delay of the preceding train 2A upon the arrival of the preceding train 2A at B station, and thus transmits, to the on-board device 50 of the following train 2B, the second target arrival time that depends on the degree of delay of the preceding train 2A. As a result, even though the delay of the following train 2B may increase while the following train 2B is running with the first target arrival time on the run curve $C3_n$ in n-th low-speed mode that represents the lowest speed, the operation management device 10 can cause the following train 2B to run such that the delay of the following train 2B is recovered.

After the arrival of the preceding train 2A at B station, the operation management device 10 determines that the preceding train 2A has departed from B station while the following train 2B is present at a position P4, in which case information on the third target arrival time or the full acceleration instruction is transmitted from the operation management device 10 to the on-board device 50 of the following train 2B. The processing unit 54 of the on-board device 50 in the following train 2B selects the run curve suited to the third target arrival time or the full acceleration instruction, i.e., the run curve C2 in recovery mode having a shorter running time than the run curve C1 in normal mode. As a result, the on-board device 50 can cause the following train 2B to run such that the delay of the following train 2B is further recovered.

As discussed above, the on-board device 50 can run on the run curve C2 in recovery mode having a shorter running time than the run curve C1 in normal mode, and thus can implement running that further recovers the delay as compared with the case where the run curve C2 in recovery mode is not prepared.

Figure 12:
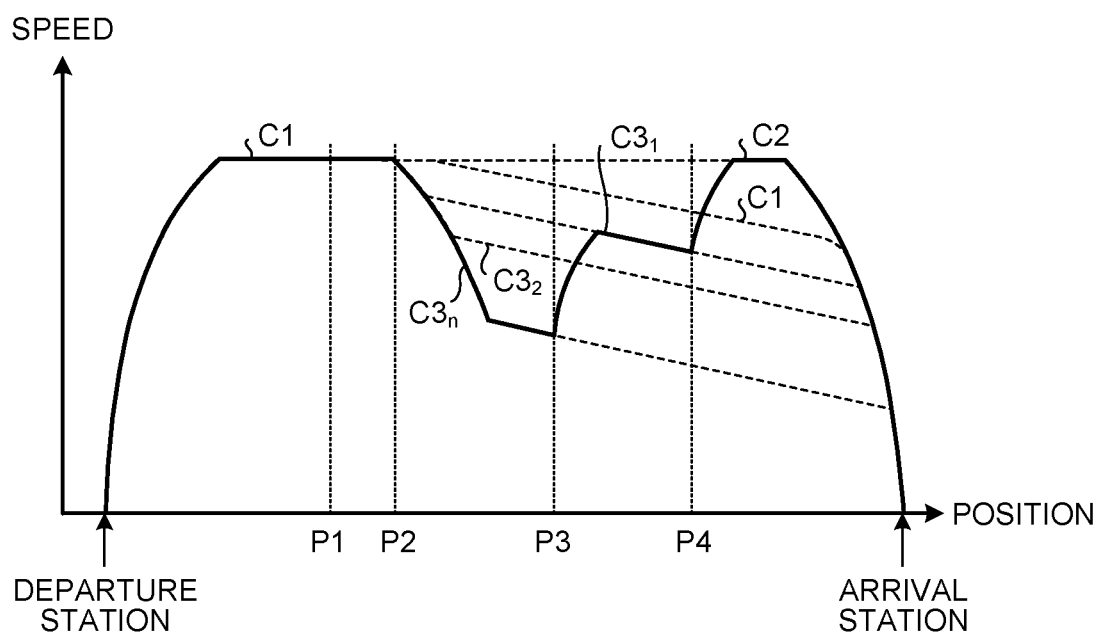
FIG. 12 is a diagram illustrating another example of a run curve selected by the processing unit of the on-board device on the basis of each of the first target arrival time, the second target arrival time, and the third target arrival time calculated by the processing unit of the operation management device according to the first embodiment.

FIG. 11 illustrates an example case where the delay of the preceding train 2A in arriving at B station occurs before the following train 2B departs from A station. An example case where the delay of the preceding train 2A occurs after the following train 2B departs from A station will be described hereinbelow. FIG. 12 is a diagram illustrating another example of a run curve selected by the processing unit of the on-board device on the basis of each of the first target arrival time, the second target arrival time, and the third target arrival time calculated by the processing unit of the operation management device according to the first embodiment.

In the example illustrated in FIG. 12, there is no delay of the preceding train 2A in arriving at B station until the following train 2B departs from A station. When the following train 2B departs from A station, thus, the processing unit 54 of the on-board device 50 in the following train 2B selects the run curve C2 in normal mode from among the plurality of run curves C1, C2, $C3_1$, $C3_2$, . . . , and $C3_n$ stored in the storage unit 53.

Note that the calculation unit 24 of the operation management device 10 can calculate the target arrival time of the following train 2B at which the following train 2B is to arrive at B station even when the preceding train 2A does not have a delay in arriving at B station. In this case, on the basis of, for example, the schedule information 30 and the train information 32 stored in the storage unit 12, the calculation unit 24 calculates the target arrival time of the following train 2B at which the following train 2B is to arrive at B station. The target arrival time is transmitted from the communication unit 11 to the on-board device 50 of the following train 2B. The processing unit 54 of the on-board device 50 in the following train 2B selects the run curve C2 in normal mode on the basis of the target arrival time transmitted from the operation management device 10.

In the example illustrated in FIG. 12, the operation management device 10 can determine that the preceding train 2A has a delay in arriving at B station while the following train 2B is present at the position P1 after departing from A station, in which case information on the first target arrival time is transmitted from the operation management device 10 to the on-board device 50 of the following train 2B. Then, the processing unit 54 of the on-board device 50 in the following train 2B selects the run curve $C3_n$ in n-th low-speed mode that represents the lowest speed, as the run curve suited to the first target arrival time.

As described above, the plurality of run curves C1, C2, $C3_1$, $C3_2$, . . . , and $C3_n$ have a common speed characteristic in the section from the departure station to the position P2 as illustrated in FIG. 8. Thus, in the case where the delay of the preceding train 2A in arriving at B station occurs while the following train 2B is present at the position P1 before the position P2, the run curve selected by the processing unit 54 is switched from the run curve C1 to the run curve $C3_n$, but the speed at the position P1 does not differ between the run curve C1 and the run curve $C3_n$.

Thus, in the case where the arrival delay of the preceding train 2A at B station occurs after the following train 2B departs from A station, speed switching is not required, and the processing unit 54 can easily select a run curve. For example, the processing unit 54 can easily calculate the arrival time expected for the train 2 running on each run curve by subtracting, from the running time of each run curve, the time taken for the following train 2B to move from A station to the position P1, and can easily select a run curve.

The operation management device 10 can determine that the preceding train 2A has arrived at B station while the following train 2B is present at a position P3 after the occurrence of the delay of the preceding train 2A in arriving at B station, in which case information on the second target arrival time is transmitted from the operation management device 10 to the on-board device 50 of the following train 2B. The processing unit 54 of the on-board device 50 in the following train 2B selects the run curve suited to the second target arrival time, i.e., the run curve $C3_1$ in first low-speed mode having a shorter running time than the run curve $C3_n$ in n-th low-speed mode.

As discussed above, the operation management device 10 is able to determine the degree of delay of the preceding train 2A upon the arrival of the preceding train 2A at B station, and thus transmits, to the on-board device 50 of the following train 2B, the second target arrival time that depends on the degree of delay of the preceding train 2A. As a result, even though the delay of the following train 2B may increase while the following train 2B is running with the first target arrival time on the run curve $C3_n$ in n-th low-speed mode that represents the lowest speed, the operation management device 10 can cause the following train 2B to run such that the delay of the following train 2B is recovered.

After the arrival of the preceding train 2A at B station, the operation management device 10 determines that the preceding train 2A has departed from B station while the following train 2B is present at the position P4, in which case information on the third target arrival time or the full acceleration instruction is transmitted from the operation management device 10 to the on-board device 50 of the following train 2B. The processing unit 54 of the on-board device 50 in the following train 2B selects the run curve suited to the third target arrival time or the full acceleration instruction, i.e., the run curve C2 in recovery mode having a shorter running time than the run curve C1 in normal mode. This enables the following train 2B to run such that the delay of the following train 2B is further recovered.

As discussed above, the on-board device 50 can run on the run curve C2 in recovery mode having a shorter running time than the run curve C1 in normal mode, and thus can implement running that further recovers the delay as compared with the case where the run curve C2 in recovery mode is not prepared.

Figure 13:
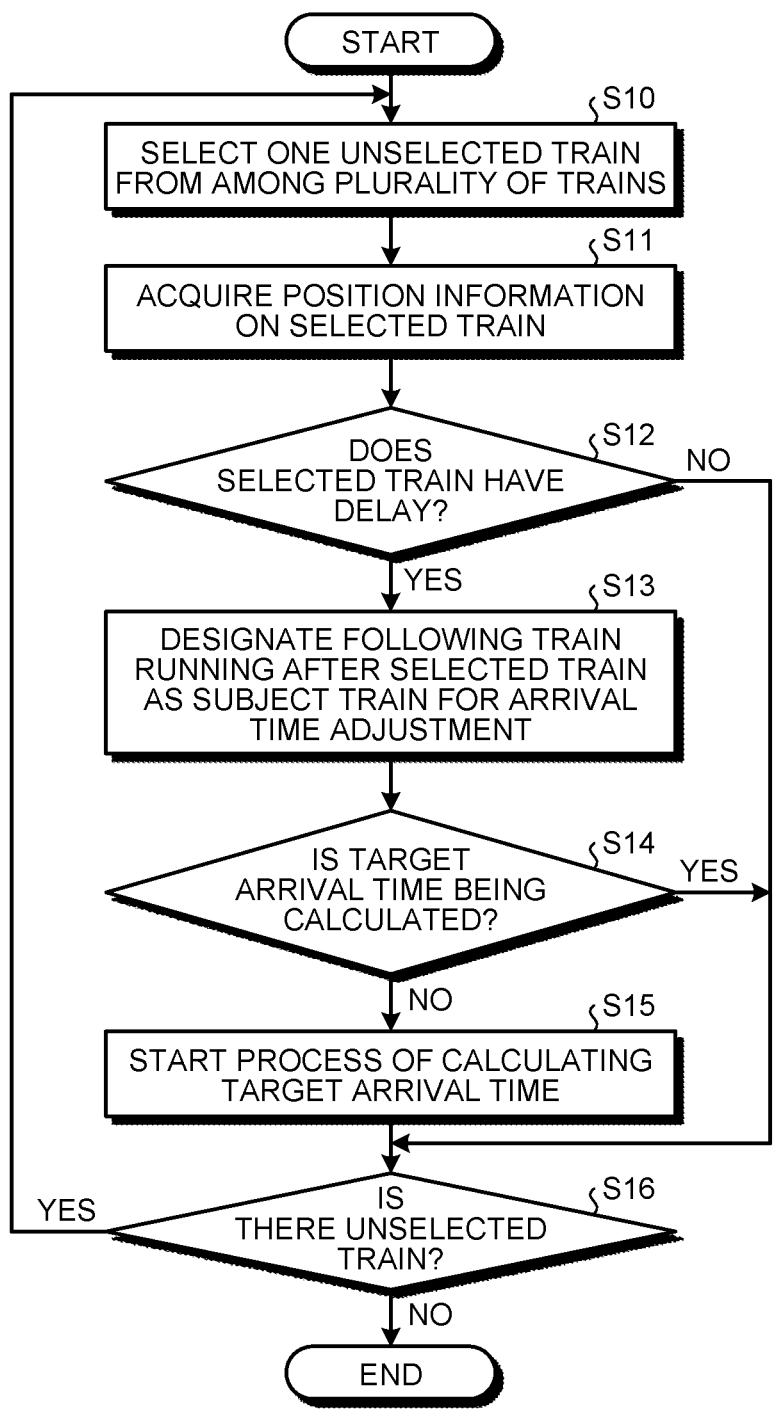
FIG. 13 is a flowchart illustrating an exemplary process by the processing unit of the operation management device according to the first embodiment.

Next, a process by the processing unit 13 of the operation management device 10 will be described with reference to a flowchart. FIG. 13 is a flowchart illustrating an exemplary process by the processing unit of the operation management device according to the first embodiment. The processing unit 13 executes the process illustrated in FIG. 13 at predetermined intervals.

As illustrated in FIG. 13, the processing unit 13 of the operation management device 10 selects one unselected train 2 from among the plurality of trains 2 (step S10), and acquires position information on the selected train 2 (step S11).

Next, the processing unit 13 determines whether the train selected in step S10 has a delay (step S12). In response to determining that the train selected in step S10 has a delay (step S12: Yes), the processing unit 13 designates the following train 2B running after the selected train 2, as the subject train for arrival time adjustment (step S13). Then, the processing unit 13 determines whether the target arrival time of the subject train determined in step S13 is being calculated (step S14).

In response to determining that the target arrival time of the subject train is not being calculated (step S14: No), the processing unit 13 starts the process of calculating the target arrival time of the subject train (step S15). This calculation process corresponds to steps S20 to S30 illustrated in FIG. 14, and will be described in detail later.

In response to the end of step S15, in response to determining that the train selected in step S10 does not have a delay (step S12: No), or in response to determining that the target arrival time is being calculated for the subject train (step S14: Yes), the processing unit 13 determines whether there is a train 2 unselected in step S10 (step S16). In response to determining that there is an unselected train 2 (step S16: Yes), the processing unit 13 shifts the process to step S10. In response to determining there is no unselected train 2 (step S16: No), the processing unit 13 ends the process illustrated in FIG. 13.

Figure 14:
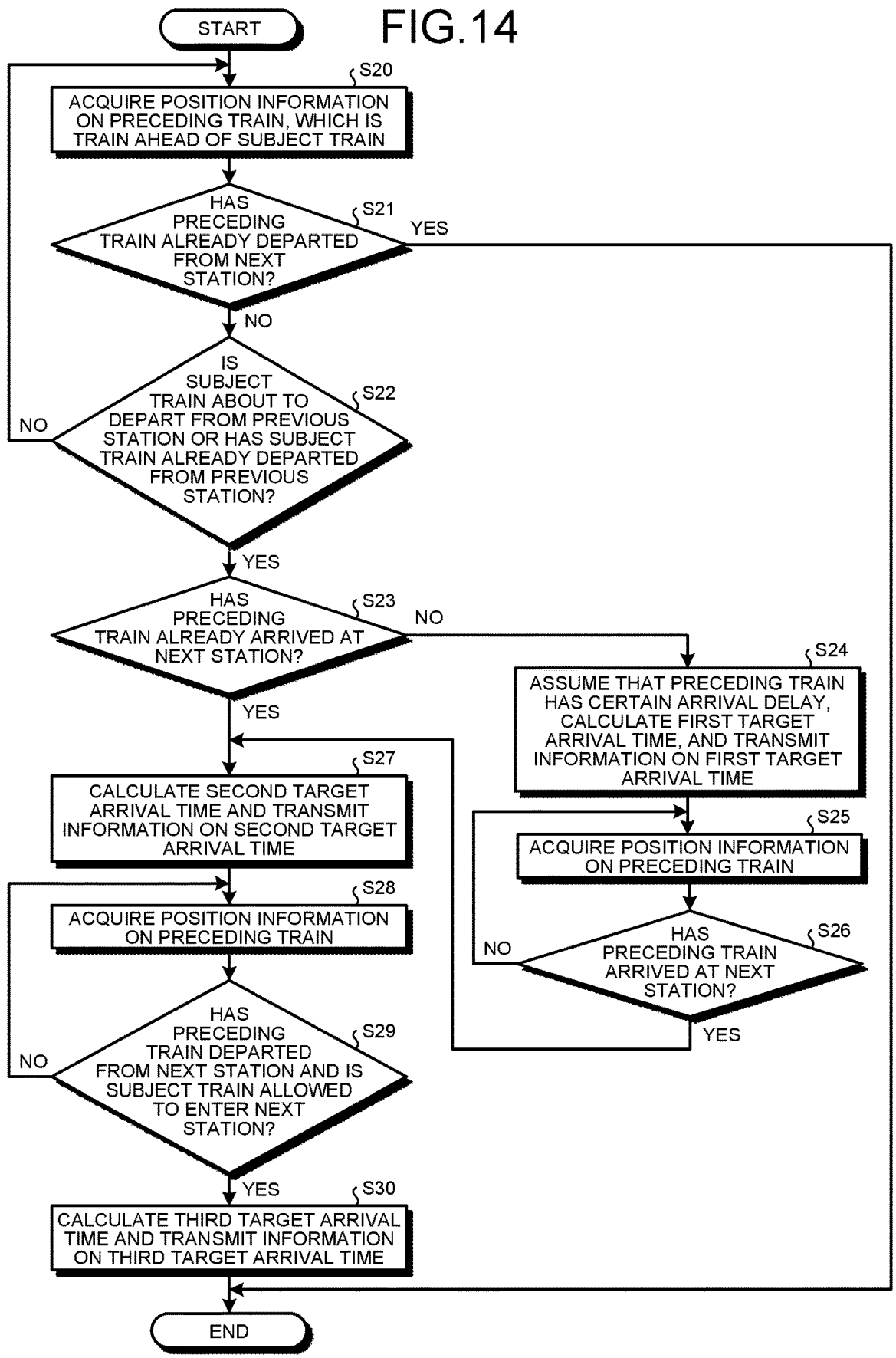
FIG. 14 is a flowchart illustrating an exemplary process of calculating a target arrival time by the processing unit of the operation management device according to the first embodiment.

FIG. 14 is a flowchart illustrating an exemplary process of calculating a target arrival time by the processing unit of the operation management device according to the first embodiment. As illustrated in FIG. 14, the processing unit 13 acquires the position information of the preceding train 2A, which is the train 2 ahead of the subject train (step S20).

Next, the processing unit 13 determines whether the preceding train 2A has already departed from the next station (step S21). In response to determining that the preceding train 2A has not yet departed from the next station (step S21: No), the processing unit 13 determines whether the subject train is about to depart from the previous station or has already departed from the previous station (step S22). In response to determining neither that the subject train is about to depart nor that the subject train has already departed (step S22: No), the processing unit 13 shifts the process to step S20.

In response to determining that the subject train is about to depart from the previous station or has already departed from the previous station (step S22: Yes), the processing unit 13 determines whether the preceding train 2A has already arrived at the next station (step S23). In response to determining that the preceding train 2A has not yet arrived at the next station (step S23: No), the processing unit 13 assumes that the preceding train 2A has a certain delay in arriving at the next station, calculates as the first target arrival time that is the target arrival time at which the subject train is to arrive at the next station, and causes the communication unit 11 to transmit information on the calculated first target arrival time to the subject train (step S24).

Next, the processing unit 13 acquires the position information on the preceding train 2A (step S25), and determines whether the preceding train 2A has arrived at the next station (step S26). In response to determining that the preceding train 2A has not arrived at the next station (step S26: No), the processing unit 13 shifts the process to step S25.

In response to determining that the preceding train 2A has arrived at the next station (step S26: Yes) or that the preceding train 2A has already arrived at the next station (step S23: Yes), the processing unit 13 calculates the second target arrival time that is the target arrival time at which the subject train is to arrive at the next station, and causes the communication unit 11 to transmit information of the calculated second target arrival time (step S27).

Next, the processing unit 13 acquires the position information on the preceding train 2A (step S28), and determines whether the preceding train 2A has departed from the next station and the subject train is allowed to enter the next station (step S29). In response to determining that the preceding train 2A has not departed from the next station or that the subject train is not allowed to enter the next station (step S29: No), the processing unit 13 shifts the process to step S28.

In response to determining that the preceding train 2A has departed from the next station and the subject train is allowed to enter the next station (step S29: Yes), the processing unit 13 calculates the third target arrival time that is the target arrival time at which the subject train is to arrive at the next station, and causes the communication unit 11 to transmit information on the third target arrival time (step S30). In response to the end of step S30 or in response to determining that the preceding train 2A has already departed from the next station (step S21: Yes), the processing unit 13 ends the process illustrated in FIG. 14.

Figure 15:
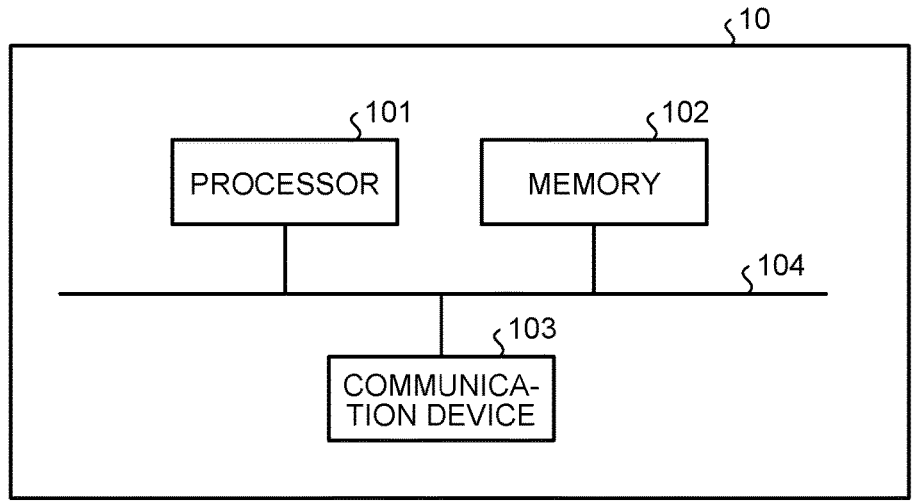
FIG. 15 is a diagram illustrating an exemplary hardware configuration of the operation management device according to the first embodiment.

FIG. 15 is a diagram illustrating an exemplary hardware configuration of the operation management device according to the first embodiment. As illustrated in FIG. 15, the operation management device 10 includes a computer including a processor 101, a memory 102, a communication device 103, and a bus 104.

The processor 101, the memory 102, and the communication device 103 can exchange information with one another via the bus 104, for example. The storage unit 12 is implemented by the memory 102. The communication unit 11 is implemented by the communication device 103. The processor 101 reads and executes a program stored in the memory 102, thereby implementing the function of the processing unit 13. The processor 101 is an example of processing circuitry, and includes, for example, one or more of a central processing unit (CPU), a digital signal processer (DSP), and a system large scale integration (LSI).

The memory 102 includes one or more of a random access memory (RAM), a read only memory (ROM), a flash memory, an erasable programmable read only memory (EPROM), and an electrically erasable programmable read only memory (EEPROM, registered trademark). The memory 102 also includes a recording medium on which a computer-readable program is recorded. Such a recording medium includes one or more of a non-volatile or volatile semiconductor memory, a magnetic disk, a flexible memory, an optical disk, a compact disk, and a digital versatile disc (DVD). Note that the operation management device 10 may include an integrated circuit such as an application specific integrated circuit (ASIC) and a field programmable gate array (FPGA).

The operation management device 10 may include two or more devices. In a case where the operation management device 10 includes two or more devices, each of the two or more devices has, for example, the hardware configuration illustrated in FIG. 15. Note that communication between the two or more devices is performed via the communication device 103. In addition, the operation management device 10 may include two or more server devices. For example, the operation management device 10 may include a processing server and a data server.

As described above, the railroad system 100 according to the first embodiment includes the plurality of trains 2 and the operation management device 10. The operation management device 10 manages operation of a subject train that is at least one of the plurality of trains 2. The operation management device 10 includes the calculation unit 24 and the communication unit 11. The calculation unit 24 calculates again the target arrival time at which the subject train is to arrive at the next station, upon occurrence of a delay of the preceding train 2A in arriving at the next station, the preceding train 2A being a train among the plurality of trains 2 and running ahead of the subject train; and, upon arrival of the preceding train 2A at the next station, calculates the target arrival time at which the subject train is to arrive at the next station. The communication unit 11 transmits, to the subject train, information on the target arrival time calculated by the calculation unit 24. The operation management device 10, which calculates the target reaching time, failing to know the degree of delay of the preceding train 2A having the delay in arriving at the next station, can prevent the following train 2B from stopping between stations. Then, once the operation management device 10 knows the degree of delay of the preceding train 2A after the arrival of the preceding train 2A at the next station, the operation management device 10 recalculates the target reaching time. As a result, the railroad system 100 can prevent or reduce the delay of the following train 2B in arriving at the next station, as well as preventing the subject train from stopping between stations. That is, the railroad system 100 can prevent or reduce the delay of the following train 2B in arriving at the next station even when the preceding train 2A has a delay in arriving at the next station.

In addition, upon departure of the preceding train 2A from the next station, the calculation unit 24 calculates the target arrival time at which the subject train is to arrive at the next station. As a result, the railroad system 100 can contribute to the delay recovery of the following train 2B.

In addition, the calculation unit 24 calculates the target arrival time upon arrival of the preceding train 2A at the next station, on the basis of the arrival time at which the preceding train 2A arrives at the next station, the scheduled stoppage period during which the preceding train 2A stops at the next station, and the departure-arrival headway of trains 2 set in advance for the next station. The railroad system 100 can prevent or reduce the delay of the following train 2B in arriving at the next station.

In addition, the calculation unit 24 calculates the target arrival time upon occurrence of a delay of the preceding train 2A in arriving at the next station, assuming that the delay of the preceding train 2A in arriving at the next station is a predetermined delay irrespective of the degree of the delay of the preceding train 2A in arriving at the next station. As a result, the railroad system 100 can prevent the following train 2B from stopping between stations even when the railroad system 100 fails to know the degree of delay of the preceding train 2A having the delay in arriving at the next station.

In addition, the calculation unit 24 calculates the target arrival time while the subject train is running. As a result, the railroad system 100 can prevent or reduce the delay of the following train in arriving at the next station even when the preceding train 2A has a delay in arriving at the next station while the subject train is running.

In addition, upon occurrence of a delay of the preceding train 2A in arriving at the next station, the calculation unit 24 calculates the target arrival time while the subject train is standing at a station before the next station. As a result, the railroad system 100 can prevent or reduce the delay of the following train 2B in arriving at the next station even when the preceding train 2A has a delay in arriving at the next station while the subject train is standing at the previous station.

Each of the plurality of trains 2 includes the communication unit 51 and the processing unit 54. The communication unit 51 receives the target arrival time from the operation management device 10. The processing unit 54 determines a run curve representing changes in running speed from a previous station located immediately before the next station to the next station, the run curve being suited to the target arrival time received by the communication unit 51. As a result, each train 2 of the railroad system 100 can run using the run curve suited to the target arrival time, and the railroad system 100 can prevent or reduce the delay of the following train 2B in arriving at the next station even when the preceding train 2A has a delay in arriving at the next station.

In addition, each of the plurality of trains 2 includes the storage unit 53 that stores information on a plurality of run curves each representing the running speed from the previous station to the next station. On the basis of the target arrival time received by the communication unit 51, the processing unit 54 designates one of the plurality of run curves as the run curve suited to the target arrival time. As a result, in the railroad system 100, the run curve can be easily determined.

In addition, the plurality of run curves C1, C2, $C3_1$, $C3_2$, . . . , and $C3_n$ has a common curve from the departure station which is the previous station, to the position P2 which is a specific position. As a result, in the railroad system 100, the switching of the speed in the train 2 can be reduced, and furthermore, the run curve can be easily selected in the processing unit 54.

In addition, the plurality of run curves includes: the run curve C1 for use when there is no delay of the preceding train 2A in arriving at the next station; the plurality of run curves $C3_1$, $C3_2$, . . . , and $C3_n$ for use when there is a delay of the preceding train 2A in arriving at the next station, the run curves $C3_1$, $C3_2$, . . . , and $C3_n$ having longer running times than the run curve C1; and the run curve C2 for use when there is a delay of the preceding train 2A in arriving at the next station, the run curve C2 having a shorter running time than the run curve C1. The run curve C1 is an example of a first run curve, the run curves $C3_1$, $C3_2$, ..., and $C3_n$ are an example of second run curves, and the run curve C2 is an example of a third run curve. As a result, the railroad system 100 can accurately prevent or reduce the delay of the following train 2B in arriving at the next station, as well as preventing the subject train from stopping between stations. That is, the railroad system 100 can accurately prevent or reduce the delay of the following train 2B in arriving at the next station even when the preceding train 2A has a delay in arriving at the next station.

Second Embodiment

The railroad system according to the second embodiment is different from the railroad system according to the first embodiment in the run curve information stored in the storage unit of the on-board device. In the following description, components having the same functions as those in the first embodiment are denoted by the same reference signs, and descriptions thereof are omitted. The difference from the railroad system 100 according to the first embodiment is mainly described.

Figure 16:
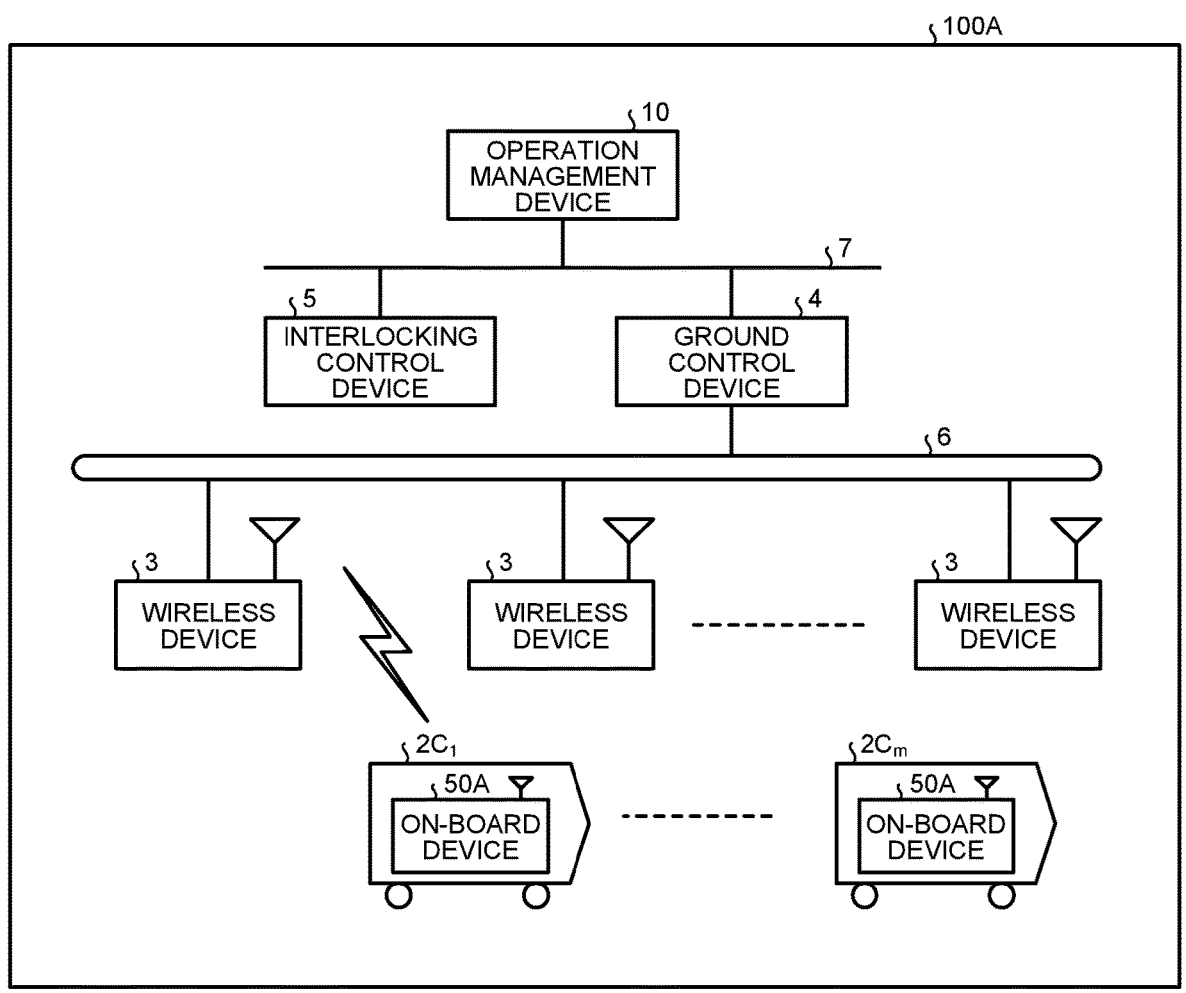
FIG. 16 is a diagram illustrating an exemplary configuration of a railroad system according to a second embodiment.

FIG. 16 is a diagram illustrating an exemplary configuration of the railroad system according to the second embodiment. The railroad system 100A according to the second embodiment is different from the railroad system 100 in that a plurality of trains $2C_1$ to $2C_m$ is provided instead of the plurality of trains $2_1$ to $2_m$. The plurality of trains $2C_1$ to $2C_m$ is different from the plurality of trains $2_1$ to $2_m$ in that an on-board device 50A is provided instead of the on-board device 50. The trains $2C_1$ to $2C_m$ may be hereinafter collectively referred to as the train(s) 2C.

Figure 17:
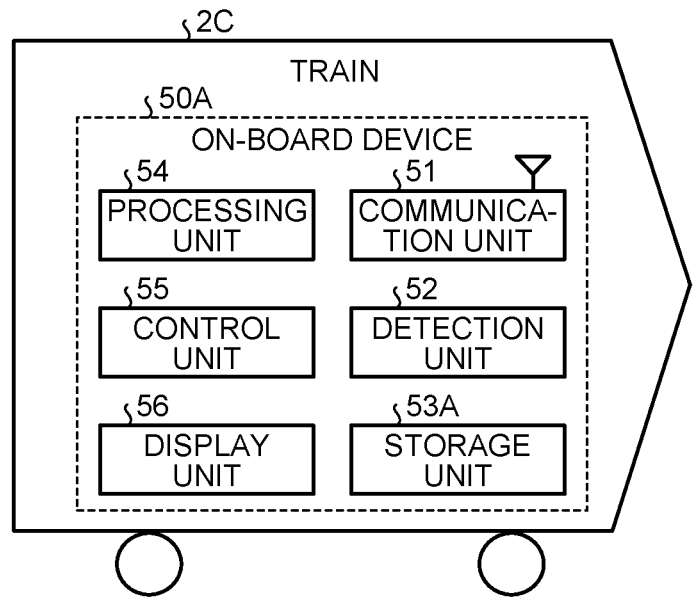
FIG. 17 is a diagram illustrating an exemplary configuration of an on-board device provided in a train according to the second embodiment.

FIG. 17 is a diagram illustrating an exemplary configuration of the on-board device provided in the train according to the second embodiment. As illustrated in FIG. 17, the on-board device 50A is different from the on-board device 50 in that a storage unit 53A is provided that stores information on a plurality of run curves different from the information on a plurality of run curves stored in the storage unit 53.

Figure 18:
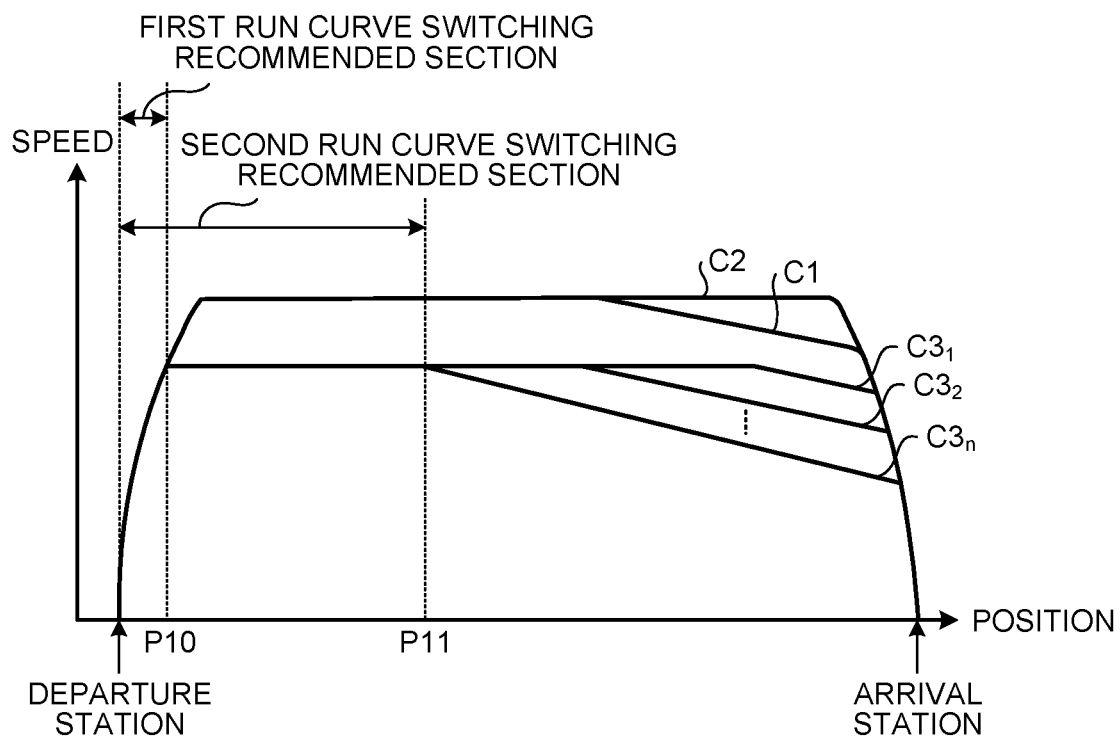
FIG. 18 is a diagram illustrating an example of a plurality of run curves according to the second embodiment.
Figure 19:
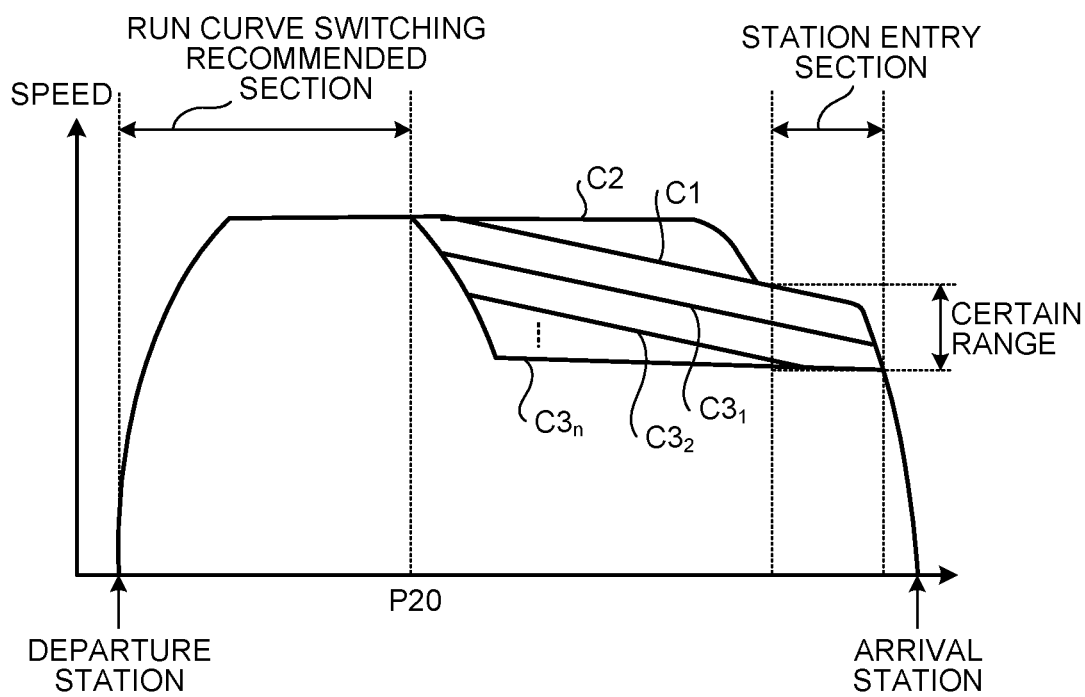
FIG. 19 is a diagram illustrating another example of a plurality of run curves according to the second embodiment.

FIG. 18 is a diagram illustrating an example of a plurality of run curves according to the second embodiment. FIG. 19 is a diagram illustrating another example of a plurality of run curves according to the second embodiment. Note that the examples illustrated in FIGS. 18 and 19 show the run curve C1 in normal mode, the run curve C2 in recovery mode, and the run curves $C3_1$, $C3_2$, ..., and $C3_n$ in low-speed mode, all of which are stored in the storage unit 53A.

The highest speeds of the run curves $C3_1$, $C3_2$, ..., and $C3_n$ in low-speed mode illustrated in FIG. 18 are lower than those of the run curves $C3_1$, $C3_2$, ..., and $C3_n$ in low-speed mode illustrated in FIG. 8. Given the same distance, the faster the trains $2_1$ to $2_m$ and $2C_1$ to $2C_m$ run, the more power they consume, that is, the higher power consumption they have. The trains $2C_1$ to $2C_m$ can therefore reduce the power consumption for running in low-speed mode as compared with the trains $2_1$ to $2_m$.

The run curves $C3_1$, $C3_2$, ..., and $C3_n$ in low-speed mode illustrated in FIG. 18 include a common acceleration section starting from the departure station, the common acceleration section being followed by a constant-speed section in which a fixed speed continues, the constant-speed section having a length that varies among the run curves $C3_1$, $C3_2$, ..., and $C3_n$. The run curves $C3_1$, $C3_2$, ..., and $C3_n$ in low-speed mode also have different running times for the different lengths of the constant-speed section. Thus, the railroad system 100A according to the second embodiment provides run curves with various running times by adjusting the length of the constant-speed section in the run curves in low-speed mode.

The run curve C1 in normal mode and the run curves $C3_1$, $C3_2$, ..., and $C3_n$ in low-speed mode illustrated in FIG. 18 have different speeds in the constant-speed section, but share a first run curve switching recommended section that is an acceleration section in which full acceleration is performed from the departure station to a position P10. Thus, if the target arrival time can be updated in the first run curve switching recommended section, the trains $2C_1$ to $2C_m$ do not accelerate/decelerate does in switching from any one of the low-speed run curves $C3_1$, $C3_2$, ..., and $C3_n$ to the run curve C1 in normal mode.

In addition, the run curves $C3_1$, $C3_2$, ..., and $C3_n$ in low-speed mode illustrated in FIG. 18 have different speeds in the constant-speed section, but share a second run curve switching recommended section that is a section from the departure station to a position P11. Thus, in a case where the trains $2C_1$ to $2C_m$ does not accelerate/decelerate in switching from any one of the low-speed run curves $C3_1$, $C3_2$, ..., and $C3_n$ to another run curve, if the target arrival time can be updated in the second run curve switching recommended section. As a result, no increase in power consumption due to the acceleration/deceleration associated with the run curve switching occurs.

As described above, when the trains $2C_1$ to $2C_m$ run according to the run curves in low-speed mode, the railroad system 100A satisfies the target running time without requiring the trains to accelerate/decelerate in switching the run curve in the second run curve switching recommended section. The railroad system 100A can therefore achieve recovery of delay and energy saving as well as satisfying the target running time.

Speed adjustment is important not only in a certain section extending from the departure station but also in a certain section extending to the arrival station. The processing unit 54 of the on-board device 50A calculates the second target reaching time, using the minimum headway included in the minimum headway information 33 in the same manner as the processing unit 54 of the on-board device 50, but the minimum headway varies depending on the station entry speed.

For example, although the following train 2B is allowed to enter the next station after the preceding train 2A departs from the next station, the following train 2B having the extremely low speed of entry to the next station takes too much time to arrive at the next station, which results in causing a significant increase in minimum headway. The plurality of run curves includes run curves having a large minimum headway and run curves having a small minimum headway.

However, the calculation unit 24 of the operation management device 10 calculates the target arrival time, using only a single minimum headway set for each pair of adjacent stations, as illustrated in FIG. 3. For this reason, a large deviation between the minimum headway used for the calculation of the target arrival time and the minimum headway of the selected run curve may occur, which results in failure to achieve highly accurate operation. In view of this, in the on-board device 50A, the plurality of run curves C1, C2, $C3_1$, $C3_2$, ..., and $C3_n$ illustrated in FIG. 19 can be stored in the storage unit 53A so that no large difference can appear between the minimum headways of the respective run curves.

The run curves C1, C2, C3$_1$, C3$_2$, ..., and C3$_n$ illustrated in FIG. 19 have the same speed characteristic in the section from the departure station to a position P20, and this section is set as a run curve switching recommended section. If the operation management device 10 can update the target arrival time in the run curve switching recommended section, acceleration/deceleration associated with the run curve switching does not occur in the trains 2A$_1$ to 2A$_m$.

In addition, the run curves C1, C2, C3$_1$, C3$_2$, ..., and C3$_n$ illustrated in FIG. 19 have a station entry section for arrival at the station in which the speed characteristic is adjusted such that the speed of entry into the arrival station does not greatly vary. In the run curves C1, C2, C3$_1$, C3$_2$, ..., and C3$_n$ illustrated in FIG. 19, the speed of the train 2 in the station entry section lies within a predetermined range around the station entry speed of the run curve that provides the smallest minimum headway indicating the departure-arrival interval. Accordingly, the run curves C1, C2, C3$_1$, C3$_2$, ..., and C3$_n$ illustrated in FIG. 19 have a smaller difference between minimum headways than the run curves C1, C2, C3$_1$, C3$_2$, ..., and C3$_n$ illustrated in FIGS. 7 and 18.

As discussed above, the run curves C1, C2, C3$_1$, C3$_2$, ..., and C3$_n$ illustrated in FIG. 19 have a smaller difference between minimum headways than the run curves C1, C2, C3$_1$, C3$_2$, ..., and C3$_n$ illustrated in FIGS. 7 and 18. In the railroad system 100A, thus, no large difference occurs between the minimum headway for use in the calculation of the target arrival time and the minimum headway of the run curve selected, and hence it is possible to support highly accurate operation.

In the example illustrated in FIG. 19, the run curve with a long running time has a constant speed in the station entry section. As a result, in the railroad system 100A, the difference between minimum headways can be easily reduced. Note that the run curves C1, C2, C3$_1$, C3$_2$, ..., and C3$_n$ may have the same speed in the station entry section. In this case, in the railroad system 100A, the difference between minimum headways can be eliminated.

As described above, in the railroad system 100A according to the second embodiment, the run curves C3$_1$, C3$_2$, ..., and C3$_n$ in low-speed mode include a common acceleration section starting from the departure station, the common acceleration section being followed by a constant-speed section in which a fixed speed continues, and the constant-speed section has a length that varies among the run curves C3$_1$, C3$_2$, ..., and C3$_n$. As a result, in the railroad system 100A, it is possible to prevent an increase in power consumption due to the acceleration/deceleration associated with the switching between the run curves C3$_1$, C3$_2$, ..., and C3$_n$.

In addition, in the railroad system 100A, the plurality of run curves C1, C2, C3$_1$, C3$_2$, ..., and C3$_n$ includes a section for entry to the next station in which the speed is set within a predetermined range around the station entry speed of the run curve that provides the smallest minimum headway indicating the departure-arrival interval for the arrival station. As a result, in the railroad system 100A, no large difference occurs between the minimum headways of run curves selected in the train 2C, and hence it is possible to support highly accurate operation.

The configurations described in the above-mentioned embodiments indicate examples. The embodiments can be combined with another well-known technique and with each other, and some of the configurations can be omitted or changed in a range not departing from the gist.

REFERENCE SIGNS LIST 2, 2$_1$ to 2$_m$, 2C, 2C$_1$ to 2C$_m$ train; 2A preceding train; 2B following train; 3 wireless device; 4 ground control device; 5 interlocking control device; 6, 7 network; 10 operation management device; 11, 51 communication unit; 12, 53, 53A storage unit; 13, 54 processing unit; 20 information acquisition unit; 21 course control unit; 22 delay determination unit; 23 arrival/departure determination unit; 24 calculation unit; acceleration instruction unit; 26 first calculation unit; 27 second calculation unit; 28 third calculation unit; 30 schedule information; 31 route information; 32 train information; 33 minimum headway information; 50, 50A on-board device; 52 detection unit; 55 control unit; 56 display unit; 100, 100A railroad system; 101 processor; 102 memory; 103 communication device; 104 bus.

The invention claimed is:

1. A railroad system comprising:
on-board devices installed one-to-one in a plurality of trains; and
an operation management device to manage operation of a subject train that is at least one of the plurality of trains, wherein
the operation management device includes:
calculation circuitry to: calculate a target arrival time at which the subject train is to arrive at a next station, upon occurrence of a delay of a preceding train in arriving at the next station, the preceding train being a train among the plurality of trains and running ahead of the subject train; and, upon arrival of the preceding train at the next station, thereafter, calculate a target arrival time at which the subject train is to arrive at the next station; and
a transmitter to transmit, to the subject train, information on the target arrival time calculated by the calculation circuitry, wherein
each of the on-board devices includes:
a receiver to receive the ter et arrival time from the operation management device;
a storage to store information on a plurality of run curves representing changes in running speed from a previous station located immediately before the next station to the next station; and
a processor to determine a run curve suited to the target arrival time from among the plurality of run curves, on a basis of the target arrival time received by the receiver.

2. The railroad system according to claim 1, wherein
upon departure of the preceding train from the next station, the calculation circuitry calculates a target arrival time at which the subject train is to arrive at the next station.

3. The railroad system according to claim 1, wherein
the calculation circuitry calculates the target arrival time upon arrival of the preceding train at the next station, on a basis of an arrival time at which the preceding train arrives at the next station, a scheduled stoppage period during which the preceding train stops at the next station, and a departure-arrival headway of trains set in advance for the next station.

4. The railroad system according to claim 1, wherein
the calculation circuitry calculates the target arrival time upon occurrence of a delay of the preceding train in arriving at the next station, assuming that the delay in the arrival is a predetermined delay irrespective of a degree of the arrival delay.

5. The railroad system according to claim 1, wherein the calculation circuitry calculates the target arrival time while the subject train is running.

6. The railroad system according to claim 1, wherein upon occurrence of a delay of the preceding train in arriving at the next station, the calculation circuitry calculates the target arrival time while the subject train is standing at a station before the next station.

7. The railroad system according to claim 1, wherein the plurality of run curves has a common speed characteristic from the previous station to a specific position.

8. The railroad system according to claim 1, wherein the plurality of run curves includes a common acceleration section starting from the previous station, the common acceleration section being followed by a constant-speed section in which a fixed speed continues, and the constant-speed section has a length that varies among the plurality of run curves.

9. The railroad system according to claim 1, wherein the plurality of run curves includes a section for entry to the next station in which a speed is set within a predetermined range around a station entry speed of a run curve that provides a smallest minimum headway indicating a departure-arrival interval for the next station.

10. The railroad system according to claim 1, wherein the plurality of run curves includes:
a first run curve for use when there is no delay of the preceding train in arriving at the next station;
a plurality of second run curves for use when there is a delay of the preceding train in arriving at the next station, the second run curves having a longer running time than the first run curve; and
a third run curve for use when there is a delay of the preceding train in arriving at the next station, the third run curve having a shorter running time than the first run curve.

11. An operation management device for managing operation of a subject train that is at least one of a plurality of trains, the operation management device comprising:
calculation circuitry to: calculate a target arrival time at which the subject train is to arrive at a next station, upon occurrence of a delay of a preceding train in arriving at the next station, the preceding train being a train among the plurality of trains and running ahead of the subject train; and, upon arrival of the preceding train at the next station, thereafter, calculate a target arrival time at which the subject train is to arrive at the next station; and
a transmitter to transmit, to the subject train, information on the target arrival time calculated by the calculation circuitry, wherein
an on-board device installed in each of the plurality of trains includes:
a receiver to receive the target arrival time from the operation management device;
a storage to store information on a plurality of run curves representing changes in running speed from a previous station located immediately before the next station to the next station; and
a processor to determine a run curve suited to the target arrival time from among the plurality of run curves, on a basis of the target arrival time received by the receiver.

12. The operation management device according to claim 11, wherein
upon departure of the preceding train from the next station, the calculation circuitry calculates a target arrival time at which the subject train is to arrive at the next station.

13. The operation management device according to claim 11, wherein
the calculation circuitry calculates the target arrival time upon arrival of the preceding train at the next station, on a basis of an arrival time at which the preceding train arrives at the next station, a scheduled stoppage period during which the preceding train stops at the next station, and a departure-arrival headway of trains set in advance for the next station.

14. The operation management device according to claim 11, wherein
the calculation circuitry calculates the target arrival time upon occurrence of a delay of the preceding train in arriving at the next station, assuming that the delay in the arrival is a predetermined delay irrespective of a degree of the arrival delay.

15. The operation management device according to claim 11, wherein
the calculation circuitry calculates the target arrival time while the subject train is running.

16. The operation management device according to claim 11, wherein
upon occurrence of a delay of the preceding train in arriving at the next station, the calculation circuitry calculates the target arrival time while the subject train is standing at a station before the next station.

17. The operation management device according to claim 11, wherein
the plurality of run curves has a common speed characteristic from the previous station to a specific position.

18. The operation management device according to claim 11, wherein
the plurality of run curves includes a common acceleration section starting from the previous station, the common acceleration section being followed by a constant-speed section in which a fixed speed continues, and the constant-speed section has a length that varies among the plurality of run curves.

19. The operation management device according to claim 11, wherein
the plurality of run curves includes a section for entry to the next station in which a speed is set within a predetermined range around a station entry speed of a run curve that provides a smallest minimum headway indicating a departure-arrival interval for the next station.

20. An operation management method comprising:
calculating a target arrival time at which a subject train is to arrive at a next station, upon occurrence of a delay of a preceding train in arriving at the next station, the subject train being at least one of a plurality of trains, the preceding train being a train among the plurality of trains and running ahead of the subject train;
upon arrival of the preceding train at the next station, calculating a target arrival time at which the subject train is to arrive at the next station;
transmitting, to the subject train, information on the calculated target arrival time; and
determining, on a basis of the target arrival time, a run curve suited to the target arrival time from among a plurality of run curves stored in the plurality of trains and representing changes in running speed from a previous station located immediately before the next station to the next station.

* * * * *